United States Patent [19]

Tanimori

[11] Patent Number: 5,014,223

[45] Date of Patent: May 7, 1991

[54] METHOD OF FILLING INNER REGION OF A GRAPHIC WITH TRACES OF IMAGING SPOT

[75] Inventor: Masayuki Tanimori, Kyoto, Japan

[73] Assignee: Dainippon Screen Mfg. Co., Ltd., Japan

[21] Appl. No.: 327,350

[22] Filed: Mar. 22, 1989

[30] Foreign Application Priority Data

Mar. 22, 1988 [JP] Japan .................................. 63-68988

[51] Int. Cl.[5] ........................ G06F 15/62; G06F 3/153
[52] U.S. Cl. ..................................... 364/521; 364/518; 340/728; 340/747
[58] Field of Search ........................ 364/518, 521, 491; 340/747, 728; 382/56

[56] References Cited

U.S. PATENT DOCUMENTS

| | | | |
|---|---|---|---|
| 4,003,061 | 1/1977 | La Canafora | 355/71 X |
| 4,628,466 | 12/1986 | Tymes | 364/521 |
| 4,646,076 | 2/1987 | Wiedenman et al. | 340/728 X |
| 4,791,582 | 12/1988 | Ueda et al. | 364/521 X |
| 4,815,009 | 3/1989 | Blatin | 364/521 X |

OTHER PUBLICATIONS

"Polygon Painting Method", IBM Technical Disclosure Bulletin, vol. 28, No. 7, Dec. 1985, pp. 3080–3081.

Primary Examiner—Dale M. Shaw
Assistant Examiner—Michael A. Jaffe
Attorney, Agent, or Firm—Ostrolenk, Faber, Gerb & Soffen

[57] ABSTRACT

For filling the area bounded by a two-dimensional geographic shape, a so-called graphic, with light from a scanning beam, a reduced size graphic is created within the original graphic. The reduced graphic is divided into convex loops by being divided up along a set of lines which extend parallel to a predetermined direction (Y). The respective longitudinal directions of the convex loops are detected, and then, alternate vectors are generated along the respective longitudinal directions of the convex loops. The scanning beam is moved along the vectors on a photosensitive film, thus filling the inner region of the graphic with the traces of the light beam.

10 Claims, 35 Drawing Sheets

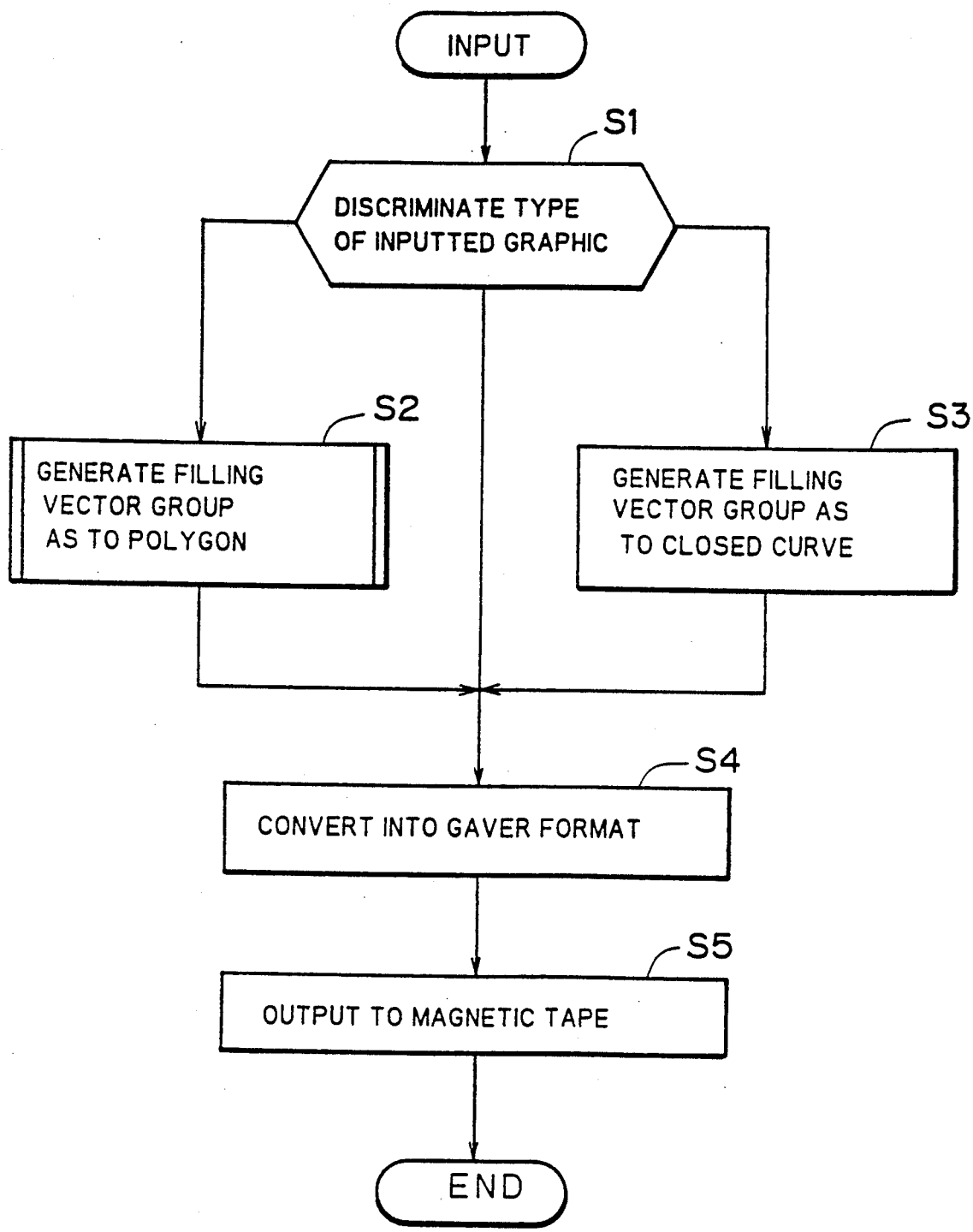

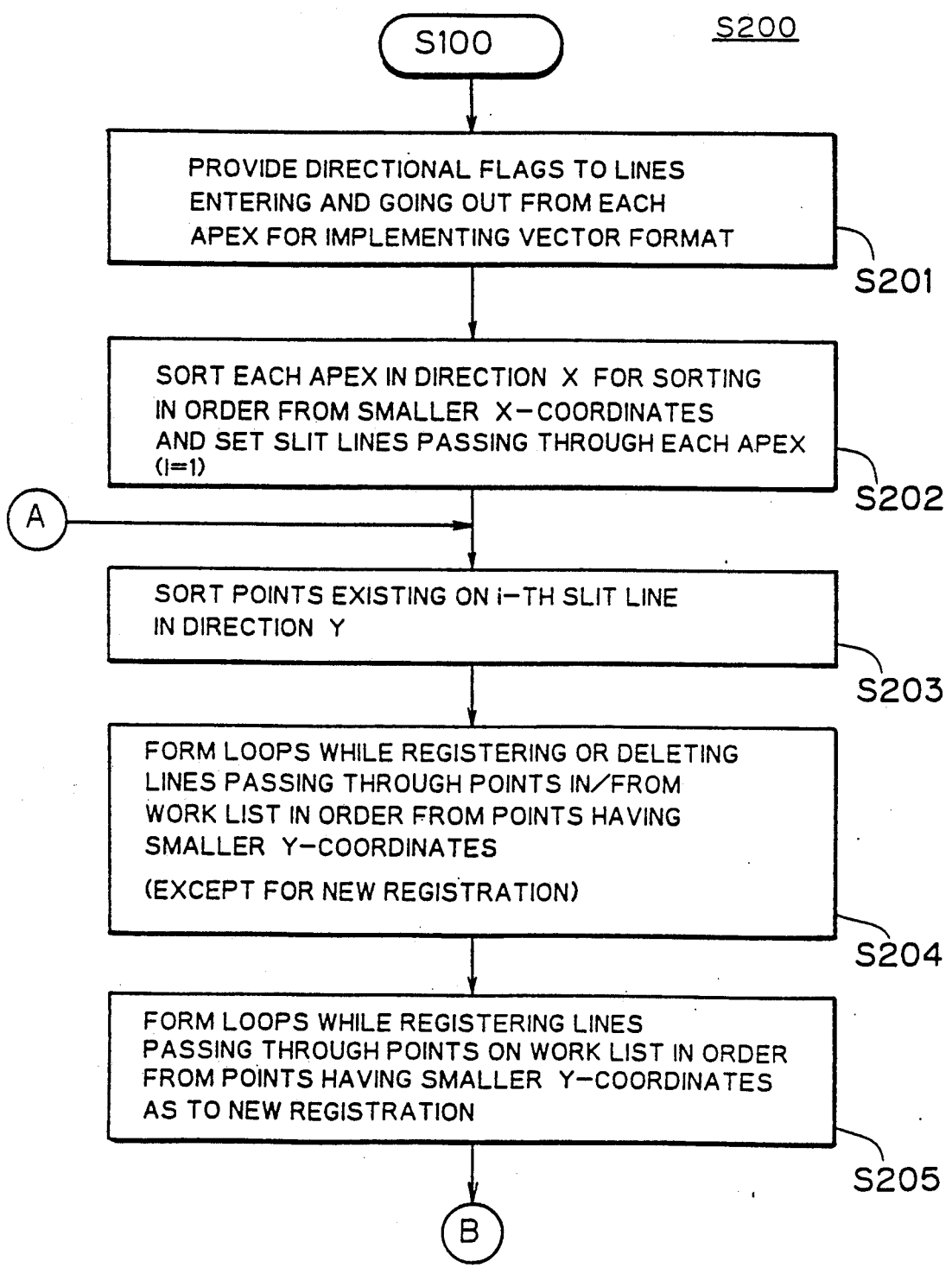

FIG. 9B

```
                    (B)
                     ↓
    ┌─────────────────────────────────────┐ S206
    │ PERFORM MUTUAL SEQUENCING IN WORK LIST│
    │ AS TO LINES HAVING END POINT COORDINATES│
    │ IDENTICAL TO COORDINATES OF POINTS OF NEW│
    │ REGISTRATION WITH REFERENCE TO INCLINATION│
    │ OF EACH LINE                        │
    └─────────────────────────────────────┘
                     ↓
              < LAST SLIT LINE ? > ──YES──→ ┌──────────────┐
                     │                     │OUTPUT FORMED │
                     NO                    │LOOPS         │
                     ↓                     └──────────────┘
              ┌──────────┐                         ↓
              │ i ← i+1  │                      ( S300 )
              └──────────┘
                     ↓                                    S207
              ┌─────────────────────────────┐
              │ IS THERE A PAIR OF LINES    │
              │ CHANGING PLACES IN ORDERING │
              │ IN DIRECTION Y ON WORK LIST │──YES──→
              │ BETWEEN (i−1)-TH SLIT LINE  │
              │ AND i-TH SLIT LINE ?        │        ┌──────────┐ S208
              │ (JUDGE INTERSECTION)        │        │ i ← i−1  │
              └─────────────────────────────┘        └──────────┘
                     │                                    ↓
                     NO                            ┌──────────────┐ S209
                     ↓                             │OBTAIN INTERSECTION│
                                                   │AND REGISTER THE  │
                                                   │SAME ON WORK LIST │
                                                   └──────────────┘
                    (A)                                   ↓
                                                    ┌──────────┐ S210
                                                    │ i ← i+1  │
                                                    └──────────┘
```

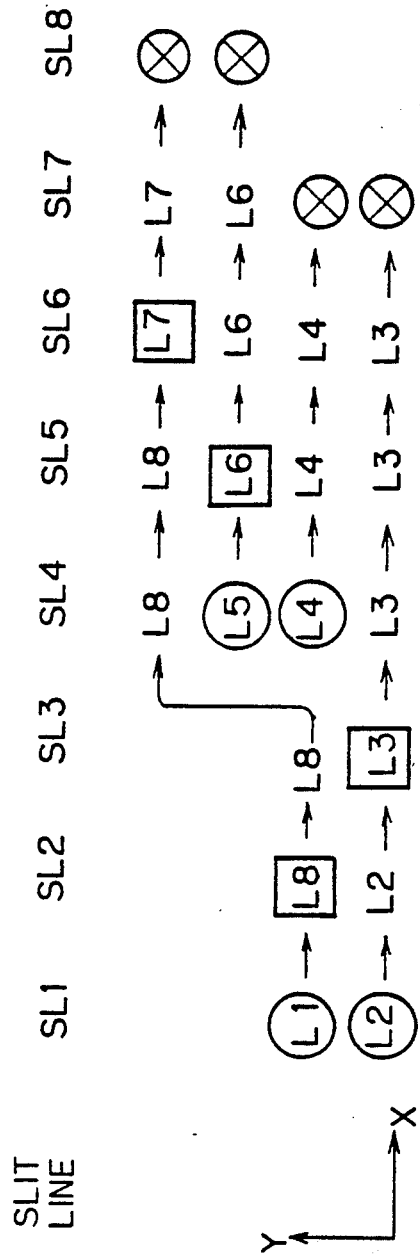

♀ : CURRENTLY NOTED SLIT LINE

CONFIGURATION I

CONFIGURATION II

CONFIGURATION III

CONFIGURATION IV

CONFIGURATION V

CONFIGURATION I

CONFIGURATION II

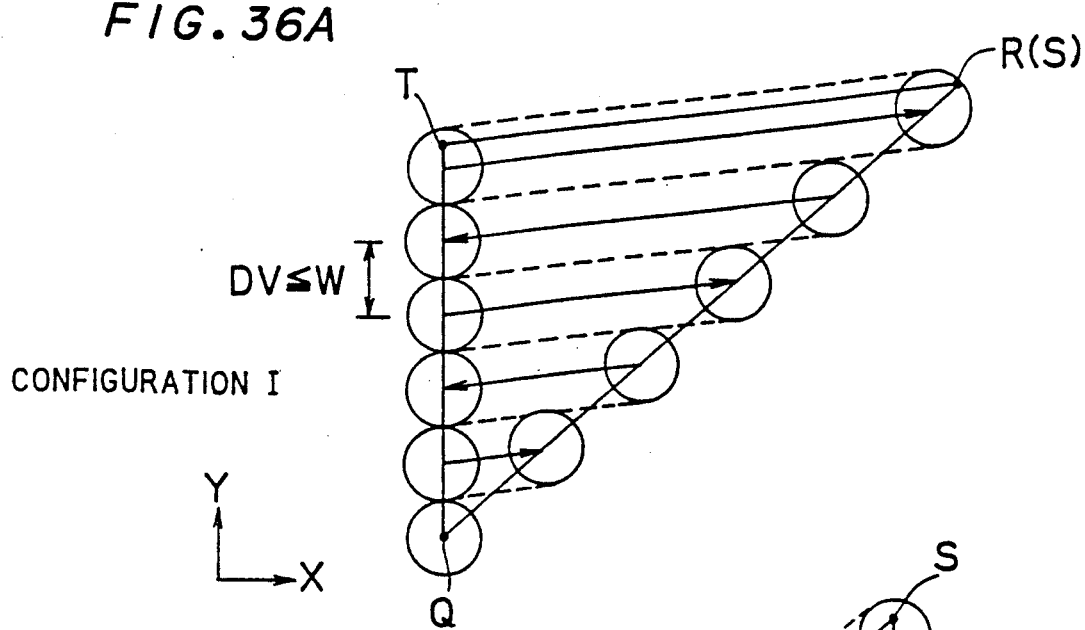
FIG.36A CONFIGURATION I
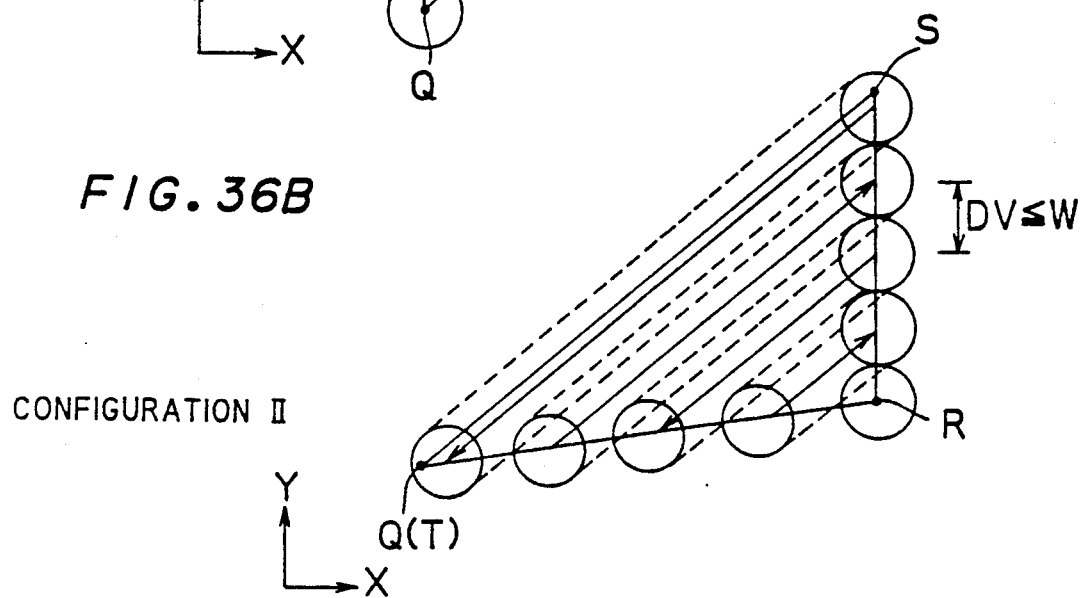
FIG.36B CONFIGURATION II
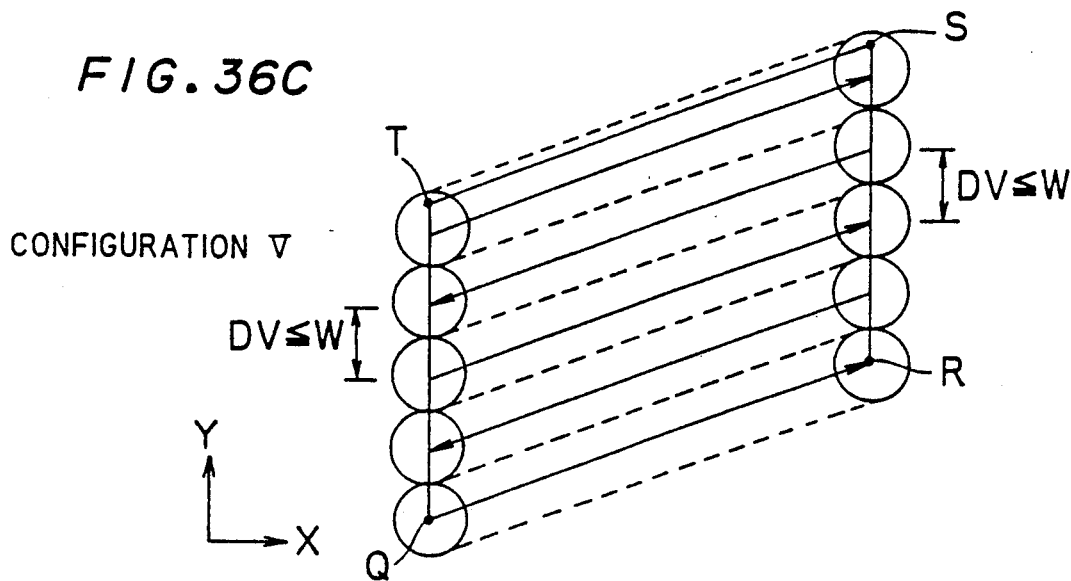
FIG.36C CONFIGURATION V

METHOD OF FILLING INNER REGION OF A GRAPHIC WITH TRACES OF IMAGING SPOT

BACKGROUND OF THE INVENTION

1. Field of the Invention

The present invention relates to a method of filling the inner region of a graphic with traces of an imaging spot having a predetermined size on an image plane.

2. Description of Background Art

In order to automatically produce a master film used for manufacturing a printed circuit board, a photoplotter is used in which a light spot is moved along a designated path on X-Y plane so as to expose a photosensitive film according to a predetermined pattern. The data indicating the position and the shape of the pattern may be prepared with a computer aided design device (CAD). The pattern is usually expressed by border lines of a closed geometric shape such as a polygon, a circle or the like, referred to herein as a "graphic". Therefore, the data indicating the pattern must be converted into "a filling data" expressing paths of the light spot in the case where the inner region of the graphic should be filled with traces of the light spot corresponding to the paths. The data conversion is conducted in a prior art device through a semimanual processing in which an operator observes the graphic and serially designates the paths with a digitizer. The prior art has one disadvantage in that it requires a substantially large time for conducting the data conversion. Another disadvantage is that the designated paths sometimes deviate from those for exposure at a high efficiency because the semimanual processing depends on the skill of the operator.

An improvement for the data conversion has been developed, but it is not sufficient for aforementioned the disadvantages. For example, suppose the case where parallel vectors are generated for designating the paths along which the inner region of a graphic is scanned with the light spot. If the graphic has a concavity, the parallel vectors are increased in number since vectors are interrupted by the mentioned concavity. Furthermore, the respective points on the border lines of the graphic must be sorted along two directions, one of which is for serially generating the vectors and the other is for distinguishing the inner region of the graphic from the outer region thereof in order to automatically detect the inner region to be filled. As a result, such an improvement also requires a long time for data conversion.

SUMMARY OF THE INVENTION

The present invention concerns for a method of filling an inner region of a graphic with traces of an imaging spot having a predetermined spot size on an image plane.

According to the present invention, the method comprises the steps of: (a) preparing graphic data expressing border lines of the graphic, (b) on the basis of the graphic data, dividing the graphic into convex loops with lines being parallel to a predetermined direction, (c) detecting respective longitudinal directions of the convex loops, (d) with respect to each of the convex loops, generating an array of vectors covering an inner region of a convex loop, where vectors belonging to the array have components in a longitudinal direction of the convex loop and are arrayed in respective traverse directions of the vectors with intervals corresponding to the spot size, (e) serially moving the imaging spot on the image plane along respective vectors which are obtained in the step (d) for the convex loops, to thereby fill the inner region of the graphic.

Preferably, the step (b) includes the steps of: (b-1) on the basis of the graphic data, generating a reduced graphic which has a shape reduced from the graphic by a predetermined width, (b-2) dividing the reduced graphic with the lines, to thereby to obtain the convex loops.

The predetermined width may be one half of the spot size.

The step (b) may further include the steps of: (b-3) detecting a concavity of the reduced graphic, (b-4) generating a bridge line for bridging a part of the concavity, and (b-5) replacing the part of the concavity with the bridge line before the step (b-2).

According to a preferred embodiment of the present invention, a first direction X and a second direction Y are defined in relation to the reduced graphic, where the first direction X is perpendicular to the predetermined direction and the second direction Y is parallel to the predetermined direction.

Respective sizes of the convex loops in the first and second directions are detected.

With respect to each of the convex loops, a first size of a convex loop in the first direction X is compared with a second size of the convex loop in the second direction Y, to thereby detect the respective longitudinal directions of the convex loops.

Accordingly, an object of the present invention is to fill the inner region of a graphic at a high efficiency even if the graphic is a complex one.

Another object of the present invention is to increase the speed at which the inner region is filled with traces of a light spot.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart showing a process according to the present invention, FIG. 13 is a diagram showing a process of registering lines on a work list, FIG. 36A, FIG. 36B and FIG. 36C are diagrams showing parallel arrows respective to the configurations I, II and V.

DESCRIPTION OF THE PREFERRED EMBODIMENTS

A. Outline of Embodiment

Figure 1:
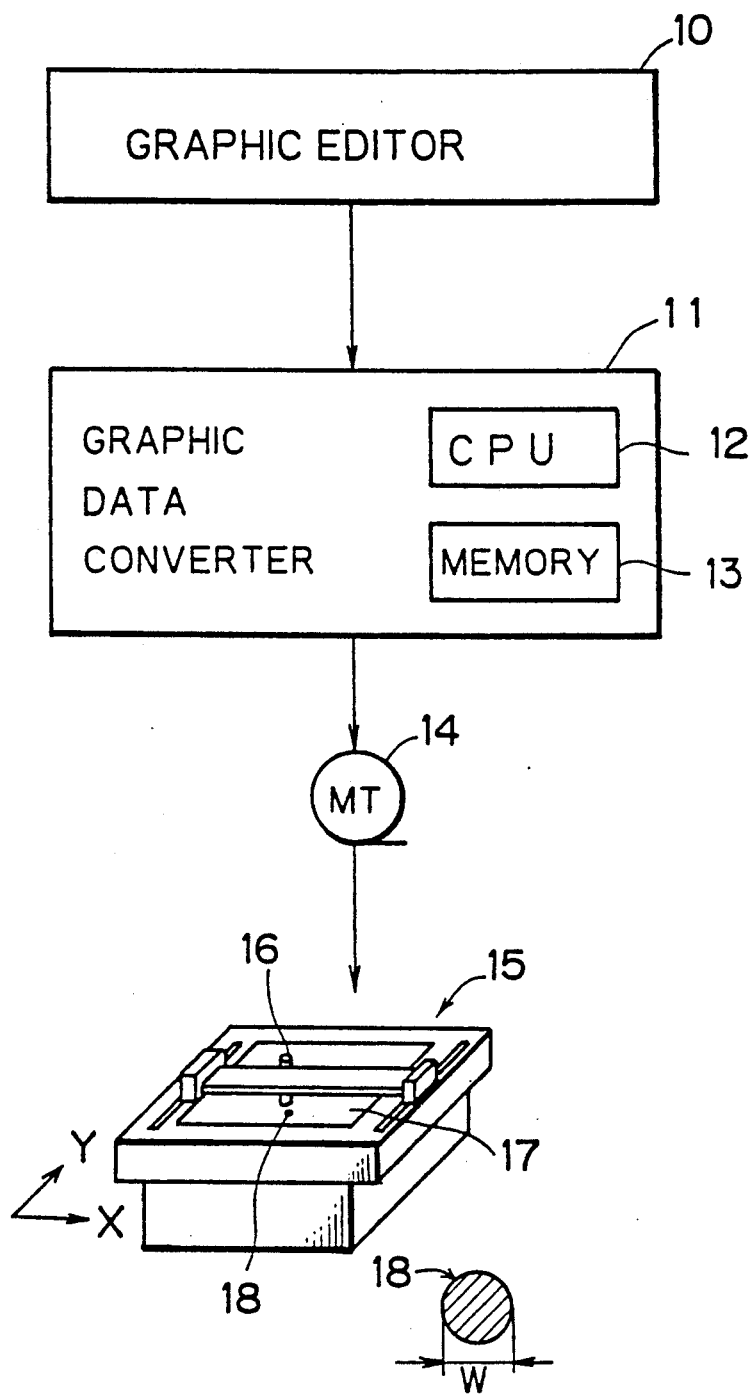
FIG. 1 is a schematic block diagram showing an image processing system according to a preferred embodiment of the present invention.
Figure 2A:
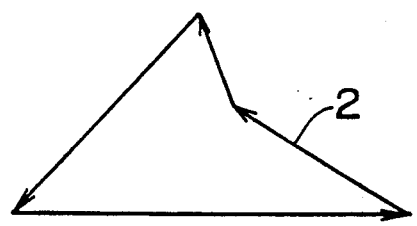
FIG. 2A is a diagram showing a graphic which is processed according to the present invention.

FIG. 1 schematically shows a system to which an embodiment of the present invention is applied for generating data to be supplied to a photoplotter 15. A graphic editor 10, which is formed by a CAD apparatus and the like, is adapted to create and edit graphic data expressing the border lines of a graphic 2 shown in FIG. 2A, for example, on the basis of inputs entered by an operator. The graphic 2 may be formed by a polygon, or a closed curve including a circle, a circular arc or the like. In the former case, the graphic data express respective sides of the polygon in a vector format. Such graphic data are identical in data format to data prepared for filling up the internal region of the graphic with an image filler by a raster recorder which scans the graphic sequentially along scanning lines, for example.

Figure 4:
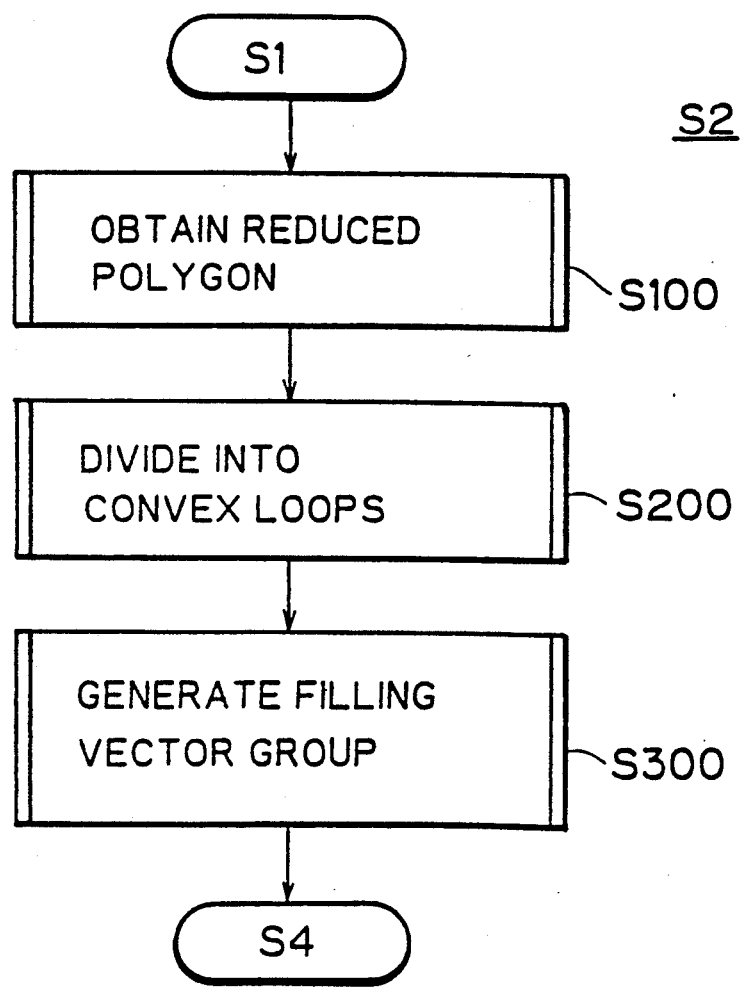
FIG. 4 is a flowchart showing details of the step S2 in FIG. 3, FIG. 5A, FIG. 5B and FIG. 5C are flowcharts showing a routine for generating a reduced polygon.

The graphic data are supplied to a graphic data converter 11, which has a CPU 12 and a memory 13. The graphic data converter 11 is adapted to perform operation corresponding to the features of the present invention on the basis of software. This apparatus first judges whether or not the inputted graphic is a polygon to be filled, a closed curve to be filled, or a graphic not to be filled (step S1 in FIG. 3). When the graphic to be filled is a polygon, the process is advanced to a step S2 to generate filling vector groups as to the polygon. Principal contents of this processing, the detail of which will be hereinafter described, are steps of generating a reduced polygon, dividing the graphic into convex loops and generating filling vector groups along the longitudinal directions of the convex loops (steps S100, S200 and S300 in FIG. 4).

Figure 2B:
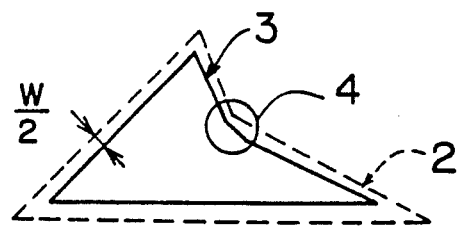
FIG. 2B is a diagram showing a reduced polygon of the graphic in FIG. 2A.

Within these steps, that of generating a reduced polygon is adapted to generate a polygon 3 (FIG. 2B) by inwardly reducing the graphic 2 by ½ of the size (diameter) W of a light spot 18 (FIG. 1), which is employed for filling the internal region of the graphic 2 in the photoplotter 15. As hereinafter described, the light spot 18 is so controlled that its center is moved only in the interior of the polygon (reduced polygon) 3. Such generation of the reduced polygon 3 corresponds to preprocessing for preventing the light spot 18 for performing filling operation from displacement toward the exterior of the graphic 2. In this operation, specific processing is also performed in a concave portion 4 of the graphic 2.

Figure 2C:
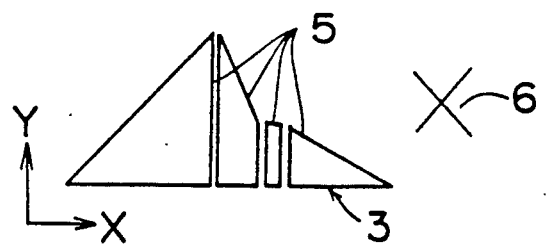
FIG. 2C is a diagram showing convex loops obtained from the polygon in FIG. 2B.

The step of dividing the graphic into convex loops is adapted to divide the reduced polygon 3 thus obtained into a set of convex loops 5 (FIG. 2C). In this embodiment, the convex loops 5 are triangles and convex quadrangles. This processing is adapted to divide the reduced polygon 3 into portions along straight lines which pass the apices of the reduced polygon 3 and are in parallel with each other along a prescribed direction Y. In this processing, a concept of "slit line" is introduced as hereinafter described, while specific processing (intersection processing) is also executed with respect to such case that respective sides forming the border lines of the reduced polygon 3 intersect with each other, i.e., with respect to intersections 6 (FIG. 2C).

Figure 2D:
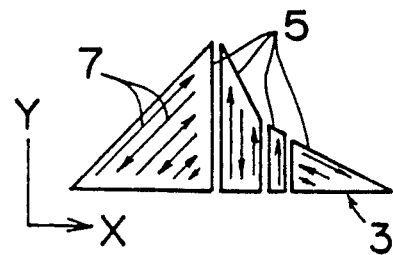
FIG. 2D is a diagram showing filling vectors for the convex loops in FIG. 2C.

The step of generating filling vector groups is adapted to generate filling vector groups 7 (FIG. 2D) for filling up the internal regions of the respective convex loops 5 at intervals indentical to the size W of the light spot 18 along the longitudinal directions of the respective convex loops 5.

When the graphic 2 is formed by a closed curve, on the other hand, a step S3 shown in FIG. 3 is executed. Although the present invention is also applicable to a closed curve, the closed curve is not divided into convex loops in this embodiment. Further, filling vectors are defined by vectors along the longitudinal direction (direction Y).

The filling vector groups for the graphic 2 thus obtained are converted into Gaver format ones at a step S4. In other words, the filling vector groups are supplied with a format suitable for a sequence of filling the internal region of the graphic 2 along loci or traces indicated by the filling vector groups, at the step S4. Filling data thus obtained are temporarily stored in a magnetic tape 14 (step S5), and then supplied to the photoplotter 15.

The photoplotter 15 has a mechanism for moving an exposure head 16 in arbitrary directions within the X-Y plane. The aperture size of the exposure head 16 corresponds to the size W of the light spot 18 which is applied to a photosensitive material 17 from the exposure head 16. The exposure head 16 is moved in directions indicated by the filling vector groups, to expose the photosensitive material 17 with the light spot 18, whereby desired recorded film, such as a master film for a printed circuit board, for example, is created by such exposure. Although two degrees of freedom X and Y of the two-dimensional moving mechanism in the photoplotter 15 are related with the coordinate axes X and Y in the graphic processing shown in FIG. 1 in this embodiment, such two groups of coordinate axes may be independent of each other.

Each processing is now described in detail.

B. Generation of Reduced Polygon (B-1) Basic Processing

Figure 5A:
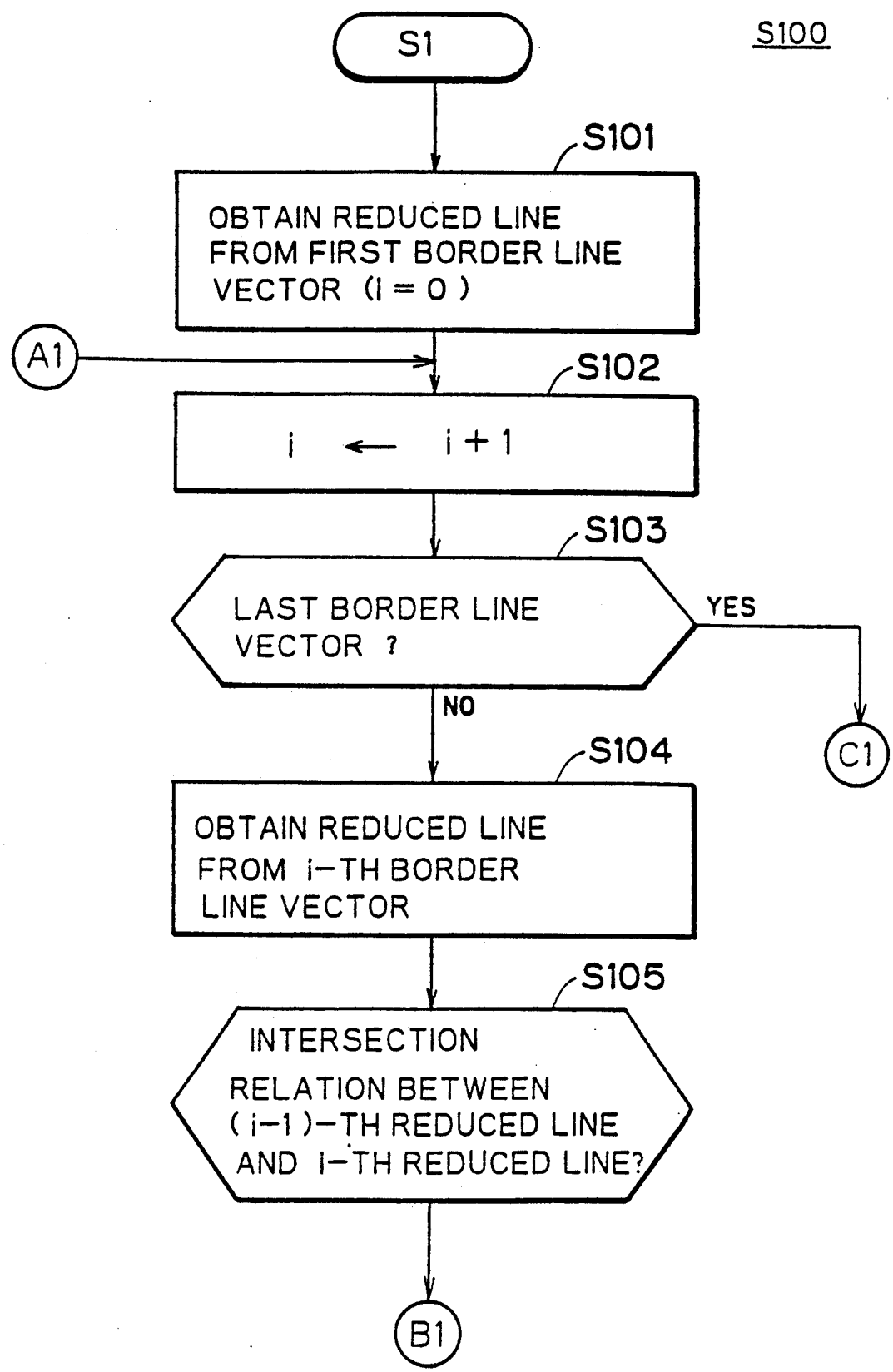
Figure 5B:
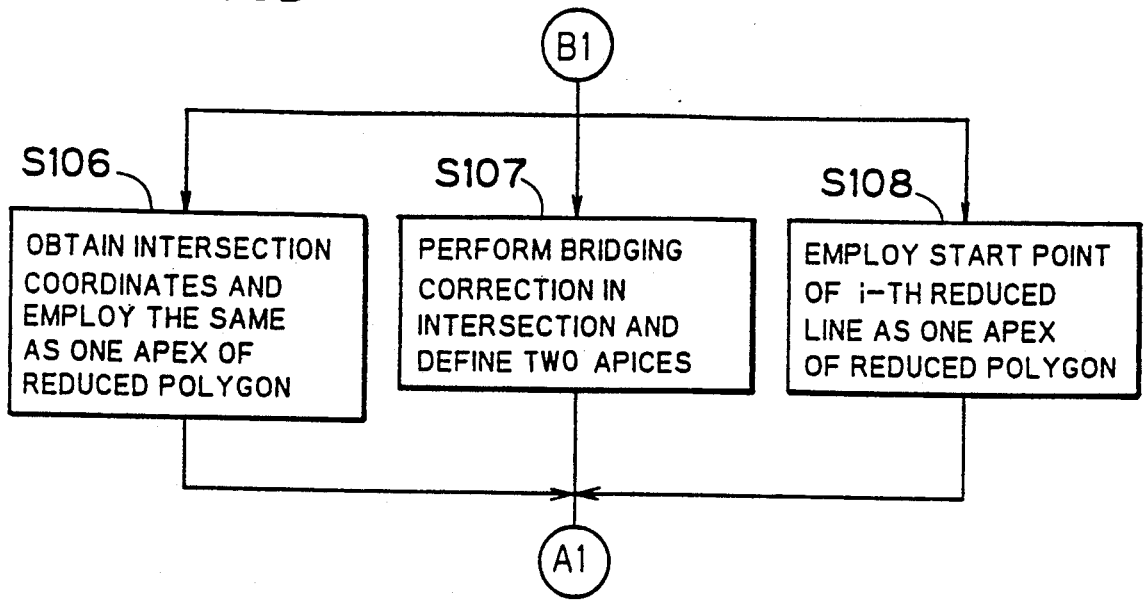
Figure 5C:
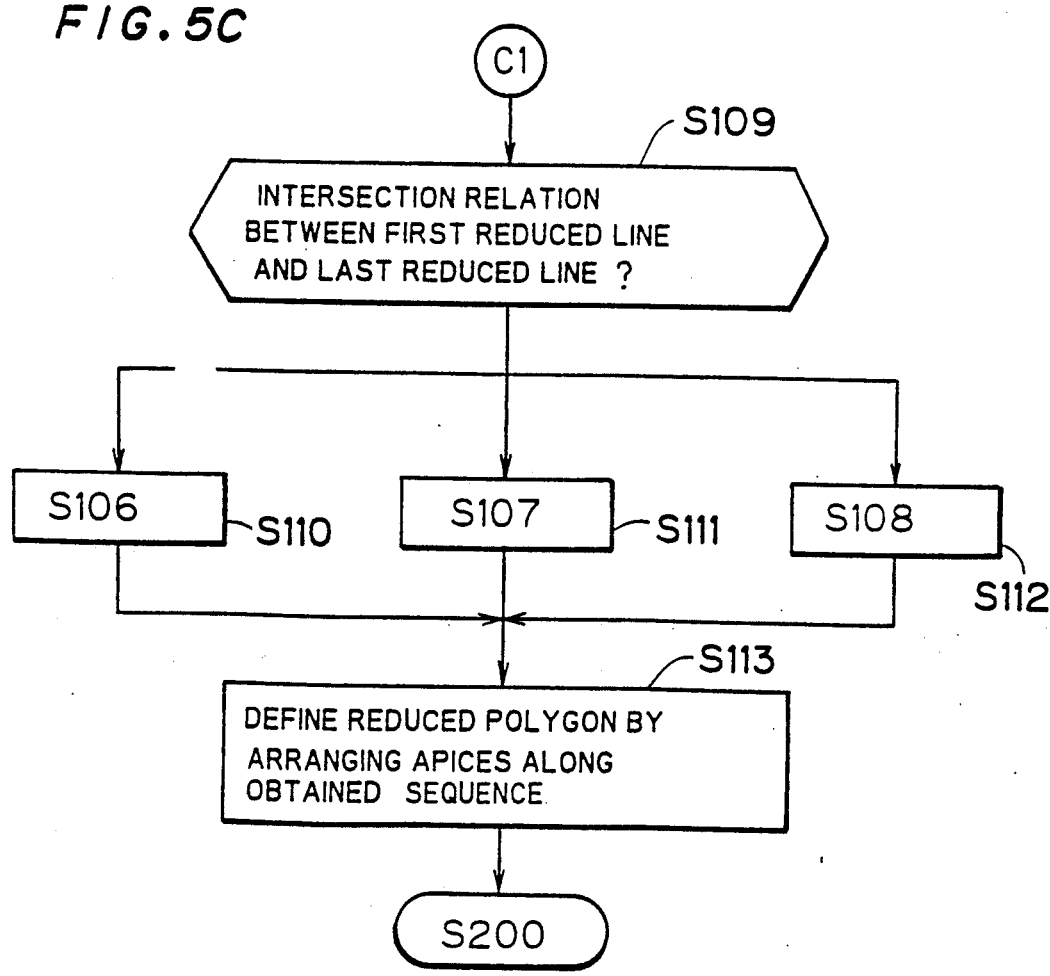

FIGS. 5A–5C show a routine for generating a reduced polygon. FIGS. 6 to 8C show the generation principle of such a reduced polygon. When the graphic data editor 10 supplies a graphic data indicating a closed polygon 20 (FIG. 6), this polygon 20 is expressed by border line vectors $\vec{P_aP_b}$, $\vec{P_bP_c}$, ..., $\vec{P_gP_a}$ sequentially connecting apices $P_a$ to $P_g$. A reduced polygon 21 is provided inside the border lines of the polygon 20 which is reduced by (W/2). When border lines of a polygon to be filled up are expressed by counterclockwise vector groups, the left side of original border line vectors $\vec{P_aP_b}$, $\vec{P_bP_c}$, ... toward the direction of progress is "inside" the polygon. Therefore, in the vicinity of the apex $P_b$, for example, the intersection between a line $\vec{P_{a0}P_{b2}}$ which is parallel to the border line vector $\vec{P_aP_b}$ and leftwardly positioned at a distance W/2 from the direction of progress of the border line vector $\vec{P_aP_b}$ and a line $\vec{P_{b1}P_{c0}}$ which is parallel to another border line vector $\vec{P_bP_c}$ and leftwardly displaced by W/2 from the direction of progress of the border line vector $\vec{P_bP_c}$ is employed as one apex B of the reduced polygon 21, as shown in FIG. 7. Within border lines L1 to L8 forming the reduced polygon 21 shown in FIG. 6, those other than the lines L4 to L6 are thus generated.

(B-2) Correction of Concave Portion

At a concave portion of the polygon 20, i.e., in the vicinity of an apex $P_e$, processing is so performed as to correct the configuration of the reduced polygon which is determined through the above process (B-1). The reason for this is that, when the process (B-1) is performed entirely over border lines of a polygon 22 shown in FIG. 8A, for example, to derive a reduced polygon 23, a new apex K1 obtained from an apex $P_{k1}$ of a concave portion will, if permitted, project outside the line L12. If this were permitted the line L12 might intersect the lines L10 and L11, interfering with the filling operation of the reduced polygon. While, in principle, the filling operation might still be performed, according to the present invention, a reverse loop (clockwise loop) is generated within a region 24. Since handling of such a reverse loop is complicated, it is preferable to prevent generation of such intersections.

If the line crossing shown in FIG. 8 appears, the trace of the exposing light spot will go out of the polygon 22 during the filling operation and the polygon 22 will not be filled correctly. This problem can be easily recognized by supposing that the center of the spot which has width W is on the apex K1. Accordingly, the correction described in the following explanation is made to solve the problem.

Figure 8A:
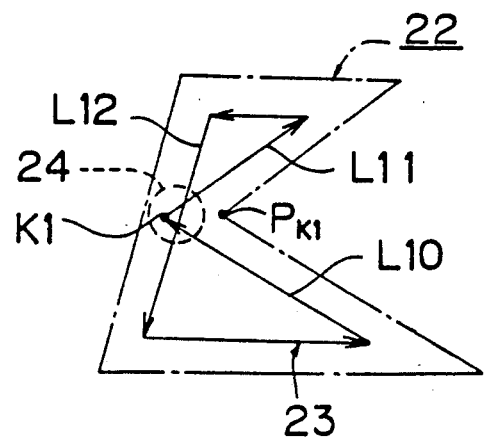
FIG. 8A is a diagram showing a reduced polygon which has a concave portion.
Figure 8B:
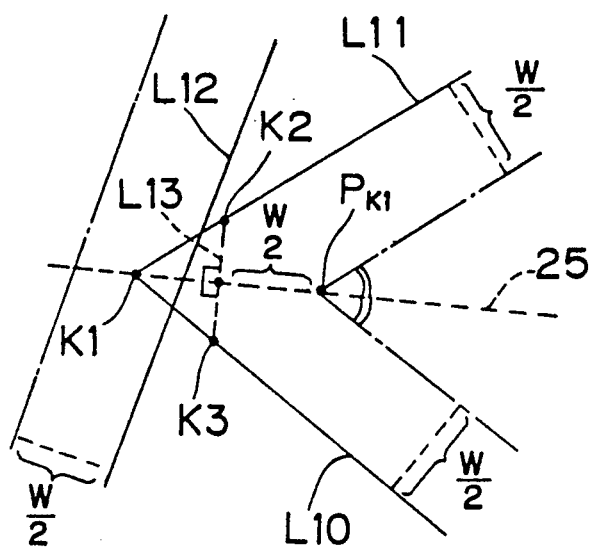
FIG. 8B is a diagram showing the concave portion shown in FIG. 8A.
Figure 8C:
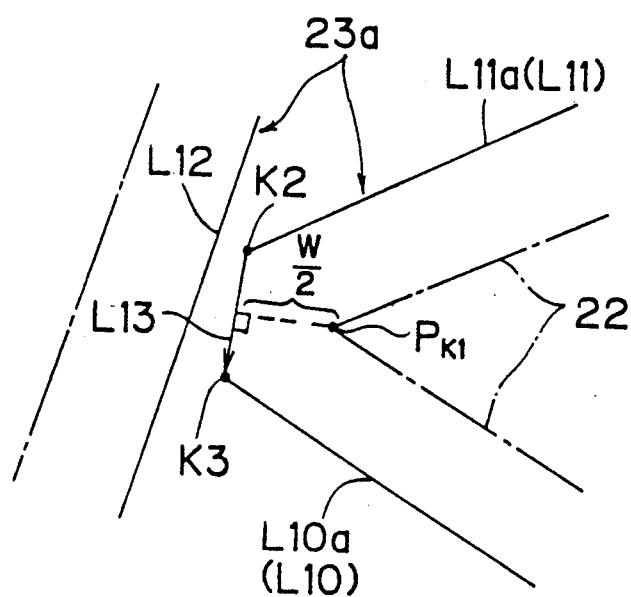
FIG. 8C is a diagram showing the corrected concave portion of the concave portion in FIG. 8B, FIG. 9A and FIG. 9B are flowcharts showing a division process for generating convex loops.

As shown in FIG. 8B illustrating the region 24 (FIG. 8A) in an enlarged manner, a new line L13 is generated which avoids the problem of the intersection of the lines L10 and L11 of the reduced polygon, otherwise obtained in the process (B-1). This line L13 is perpendicular to a straight line 25, which bisects an angle formed by the lines L10 and L11 at the apex $P_{k1}$ and is separated from the apex $P_{k1}$ by a distance (W/2). Then, intersections K2 and K3 between the lines L10 and L11 and the line L13 are employed as two apices, which are continuous to each other within the reduced polygon. As the result, a "corrected concave portion" formed by lines L10a and L11a, which are parts of the lines L10 and L11 respectively, and the line L13 is employed as a part of a corrected reduced polygon 23a, as shown in FIG. 8C. Since the distance between the line L13 and the apex $P_{k1}$ is (W/2), the light spot for filling operation is hardly displaced toward the exterior of the border lines of the polygon 22.

Figure 6:
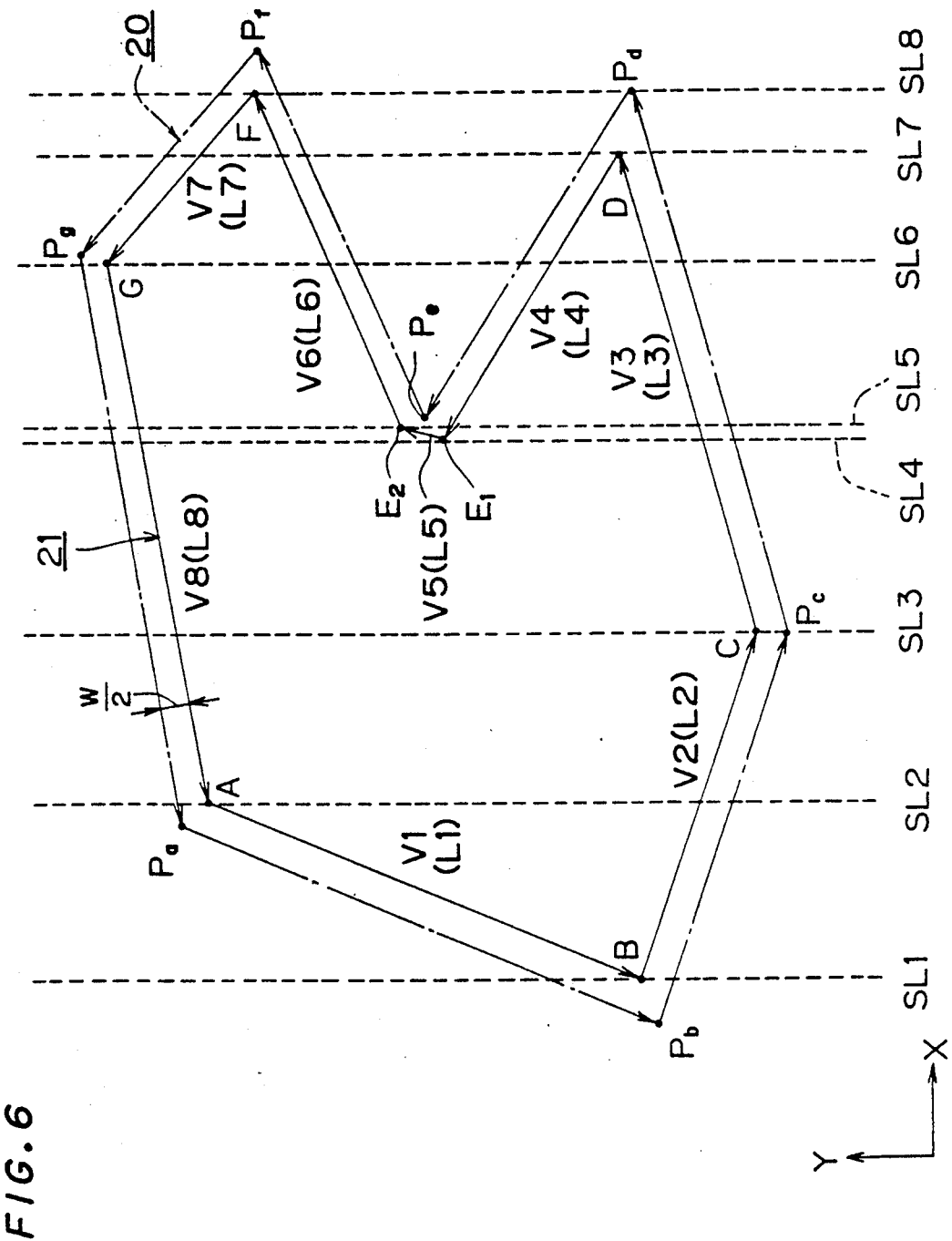
FIG. 6 is a diagram showing a closed polygon and a reduced polygon obtained from of the closed polygon.
Figure 7:
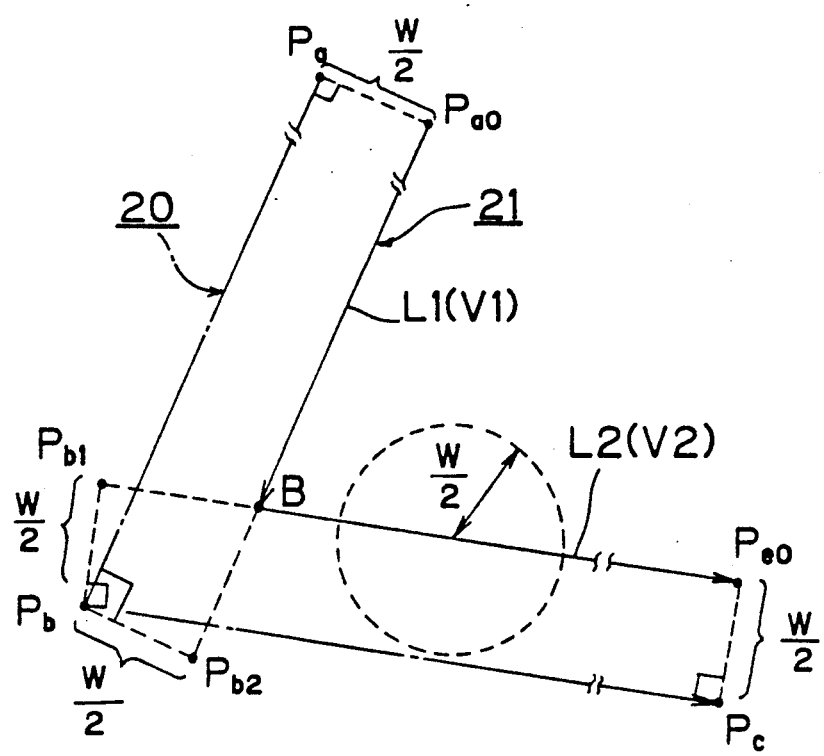
FIG. 7 is a diagram showing an apex of the closed polygon shown in FIG. 6.

Lines L4 to L6 of the reduced polygon 21 shown in FIG. 6 are defined with apices $E_1$ and $E_2$, which are obtained by such correction. Judgement as to whether or not each apex portion of the polygon 20 is a concave portion can be made by obtaining a vector product (outer product) of a border line vector entering each apex and that going out from the same and recognizing whether or not the vector product is along a direction passing through the plane of the figure.

Within steps S101 to S113 of FIG. 5 which set out the above process, the steps S109 to S112 define the procedure of defining an apex A from a connecting portion between first and last lines (lines L1 and L8 in the example shown in FIG. 6), and the steps S110 to S112 define the same procedure as the steps S106 to S108.

The reduced polygon 21 shown in FIG. 6, which is obtained through the above processing, is a closed polygon having apices A to G. The coordinate values of these apices A to G are stored in the memory 13 (FIG. 1).

C. Division into Convex Loops

(C-1) Sorting as to Direction X and Setting of Slit Lines

Figure 10:
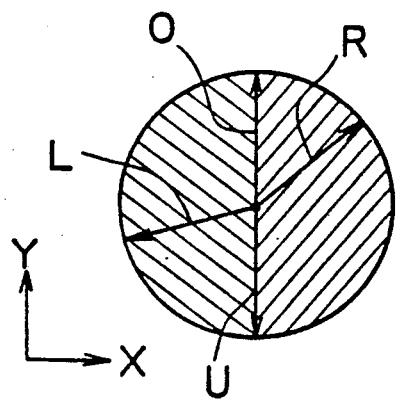
FIG. 10 is a diagram showing directional flags.
Figure 11:
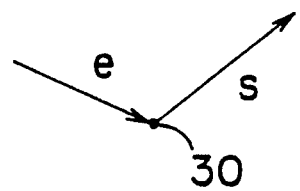
FIG. 11 is a diagram showing an end vector and a start vector.

FIGS. 9A-9B illustrate the process of dividing the reduced polygon 21 into a plurality of convex loops. First, directional flags are supplied to respective ones of lines entering the respective apices A to G of the reduced polygon 21 and those going out from the same apices (step S201). The directional flags are defined as shown in FIG. 10. These directional flags identify lines extending toward a rightward direction R, a leftward direction L, Y-axis positive direction (vertically upward direction) O and a Y-axis negative direction (vertically downward direction) U with respect to a Y-axis. Thus, data expressing the lines L1 to L8 must be provided with components for identifying the directions shown in FIG. 10. Therefore, the data is in vector format (see border line vectors V1 to V8 in FIG. 6). In the following description, the border line vector starting from an arbitrary apex 30 (FIG. 11) of the reduced polygon 21 is called a "start vector". The "start vector" is identified by the symbol "s". Another border line vector ending at the apex 30 is called an "end vector". The "end vector" is identified by the symbol "e". Table 1 shows directional flags provided to start vectors s and end vectors e at the respective apices A to G.

TABLE 1

Figure 12:
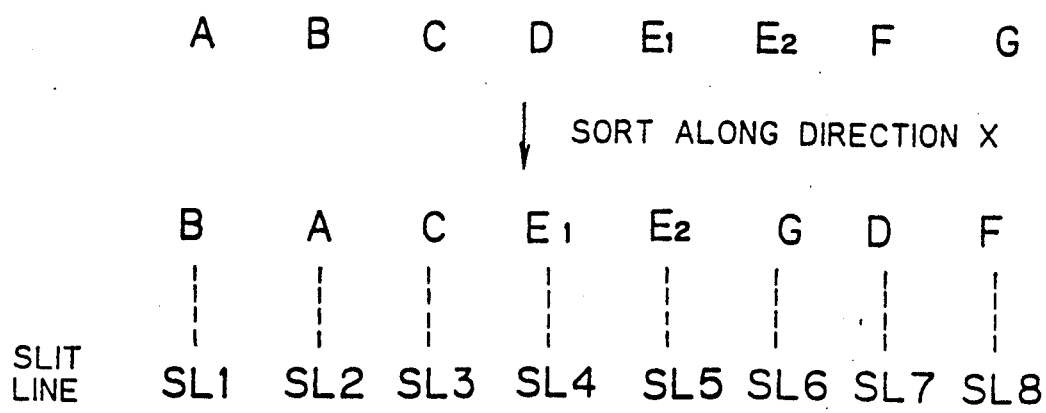
FIG. 12 is a diagram showing an example of sorting of apices into an ascending order of X coordinates.

| Apex | s | e |
|---|---|---|
| A | L (L1) | L (L8) |
| B | R (L2) | L (L1) |
| C | R (L3) | R (L2) |
| D | L (L4) | R (L3) |
| $E_1$ | R (L5) | L (L4) |
| $E_2$ | R (L6) | R (L5) |
| F | L (L7) | R (L6) |
| G | L (L8) | L (L7) | s: start vector, e: end vector.
R: rightwardly directed, L: leftwardly directed.
O: vertically upwardly directed, U: vertically downwardly directed Then, the respective apices A to G are sorted in the direction X. Through such sorting, coordinate data expressing the apices A to G are sorted within the memory 13 in order, from the apex having smaller X coordinates. Then, straight lines SL1 to SL8, which pass through the sorted apices A to G and are parallel to the Y-axis, are set (step S202 of FIG. 9 and FIGS. 12 and 6). These straight lines SL1 to SL8 are set in order to extract points having the same X coordinates with the apices A to G from those on the border lines forming the reduced polygon 21, and called "slit lines". These slit lines SL1 to SL8 are uniquely specified by specifying the X coordinate values thereof. The slit lines SL1 to SL8 are sequentially set with respect to the apices A to G sorted in the direction X, in order starting with the smallest X coordinate.

(C-2) Registration on Work List and Division into Convex Loops

Then, a work list area is prepared in a storage space which is previously secured in the memory 13. The work list is a kind of a buffer memory, which inputs and outputs line data to be operated, as described below. The lines L1 to L8 forming the reduced polygon 21 are registered on the work list. This registration, which is adapted to register end points of the respective lines in concrete terms, is hereafter called "registration of lines".

First, the first slit line SL1 in FIG. 6 is noted. The two lines L1 and L2 having end points B on the slit line SL1 are registered on the work list, as conceptually shown in FIG. 13. Then, the second slit line SL2 is noted and the lines L8 and L2 intersecting with the slit line SL2 are registered on the work list. As seen from FIG. 6, the lines L8 and L1 are coupled with each other on the slit line SL2, and hence the line L8 is exchanged for the line L1 to be registered on the work list. Thereafter in a similar manner, the lines intersecting with the respective slit lines SL3 to SL8 are registered on the work list in an interlined manner.

In such registration, a plurality of lines existing on each of the slit lines SL1 to SL8, such as the lines L8 and L2 on the slit line SL2, for example, are sorted in order from that having smaller Y-coordinates of intersections between them and the corresponding slit line and registered. Therefore, in the slit line SL6, for example, the lines L3, L4, L6 and L7 (cf. FIG. 7) are registered on the work list in this order. Sequencing or sorting of a plurality of lines having the same coordinates on a slit line, such as the lines L1 and L2 on the slit line SL1, for example, is performed by comparing the degree of inclination of such lines.

Figure 14C:
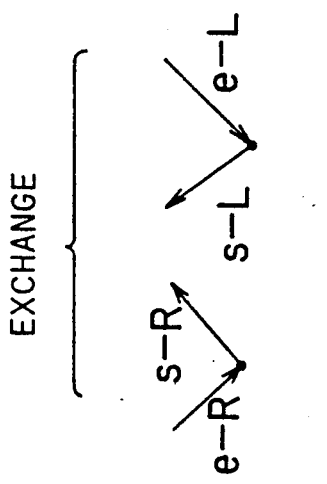
FIG. 14C is a diagram showing vectors to be exchanged.
Figure 14B:
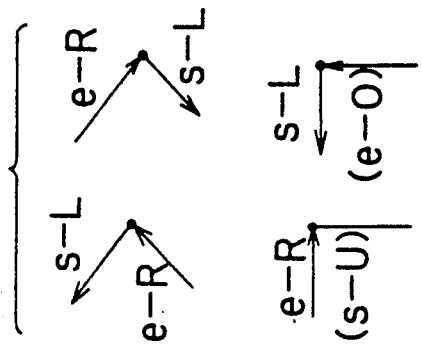
FIG. 14B is a diagram showing vectors to be deleted.
Figure 14A:
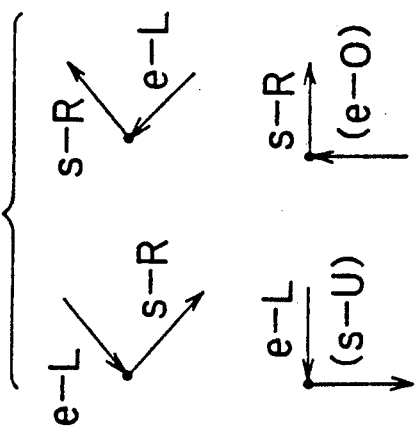
FIG. 14A is a diagram showing vectors to be registered newly.

When the slit lines SL1 to SL8 are sequentially noted along the direction X, a flag indicating "new registration" is supplied to a line appearing on the work list for the first time and an "exchange" flag is supplied to a line appearing on the work list in the form of exchange from another line. Further, a "delete" flag is supplied to a line which does not extend rightwardly from a noted slit line when there is no other line rightwardly coupled on the slit line. FIGS. 14A-14C show such relation.

Thus, the work list shown in FIG. 13 is a data space on which a chaining relation between the respective lines L1 to L8 of the reduced polygon 21 is schematically expressed with indices of positions on the respective slit lines SL1 to SL8. However, no vertical line (indicated by a flag "O" or "U") is registered on the work list.

Figure 15:
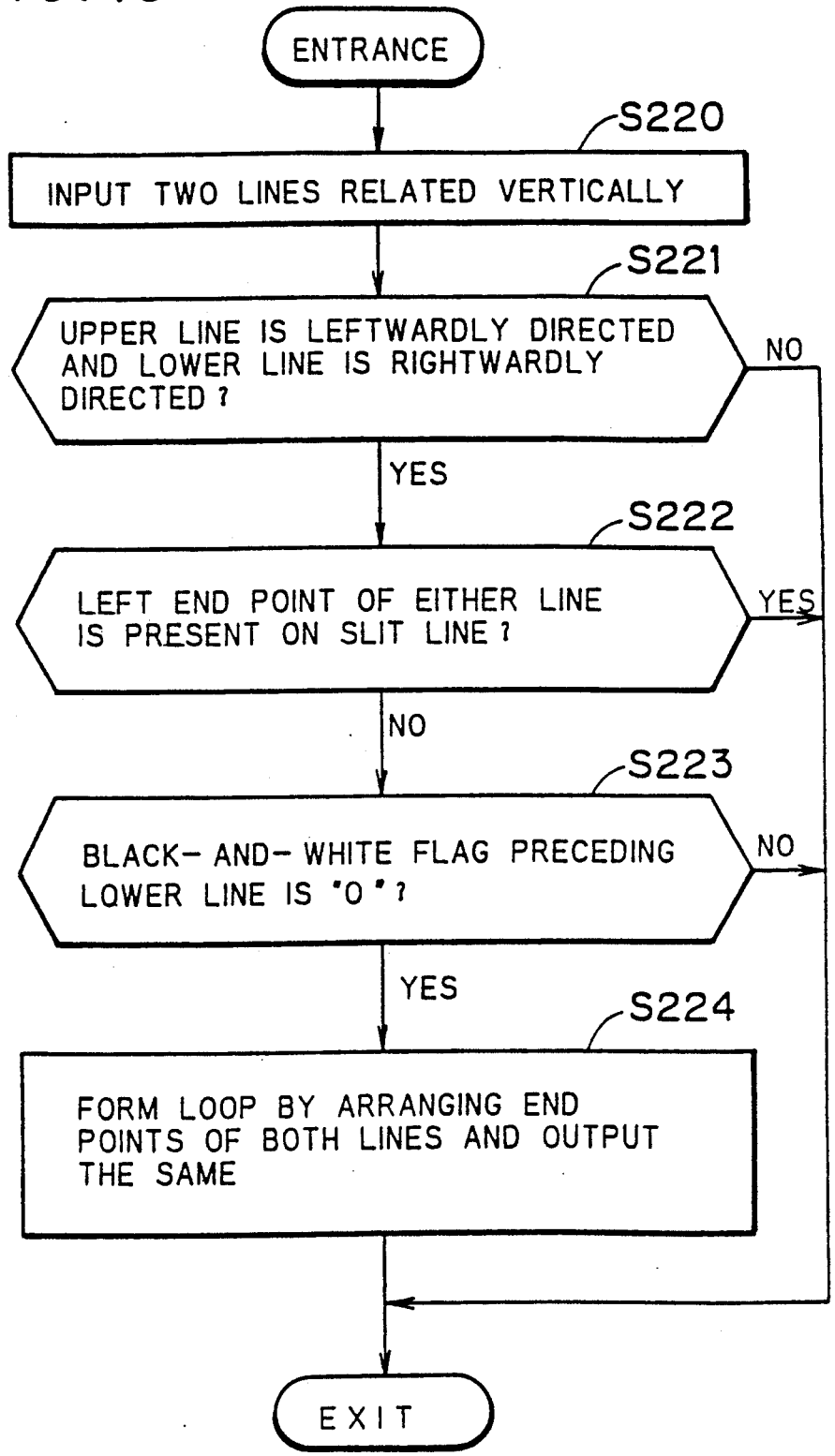
FIG. 15 is a flowchart showing a loop forming routine.
Figure 16A:
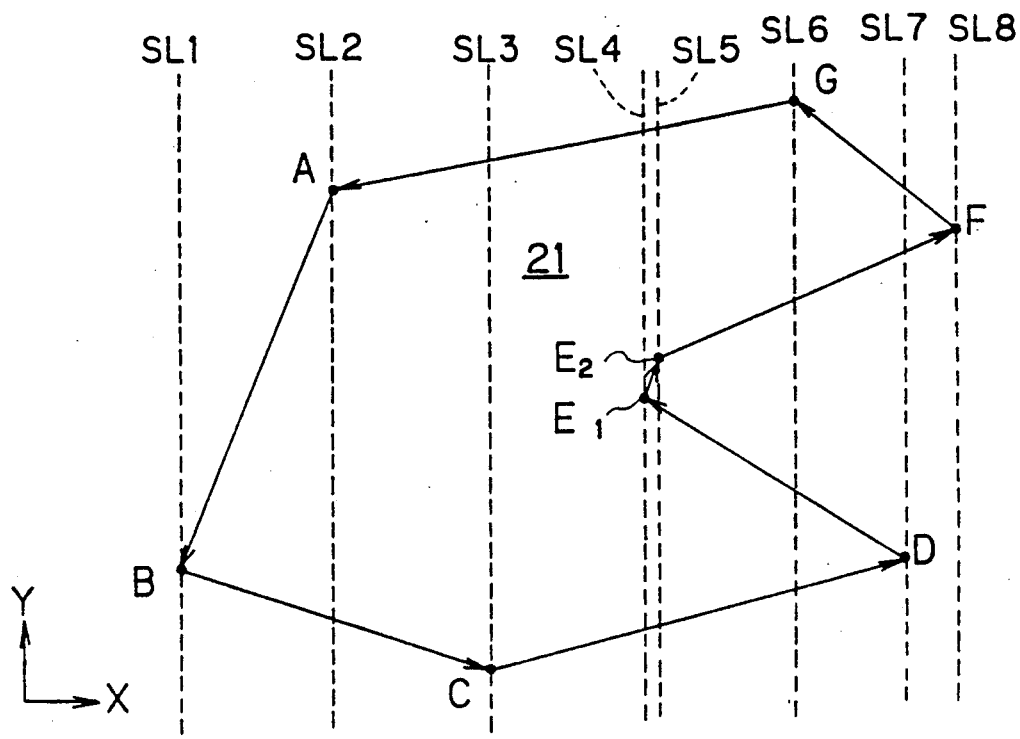
FIG. 16A is a diagram showing a reduced polygon.

In parallel with the aforementioned registration of the respective lines L1 to L8 on the work list, the reduced polygon 21 is divided into convex loops sequentially starting from the left side of the figure, by sequential division into portions with the respective slit lines SL1 to SL8. The processing is as follows: First, the aforementioned sorting in the direction Y (step S203 in FIG. 9) is performed on lines having end points on a noted slit line, and thereafter registration on the work list is made from a line having smaller Y-coordinates on the noted slit line (step S204). Then, a loop forming routine (FIG. 15) is executed every time a line is registered on or deleted from the work list. This loop forming routine is adapted to divide a part of the reduced polygon 21 into a convex loop at a step S224 in an interval between a noted slit line and that preceding the same only when three conditions shown at steps S221 to S223 in the figure are satisfied. For example, a reduced polygon 21 shown in FIG. 16A is divided into convex loops LP1 to LP7 shown in FIG. 16B upon completion of all routines in the respective slit lines SL1 to SL8.

Figure 17:
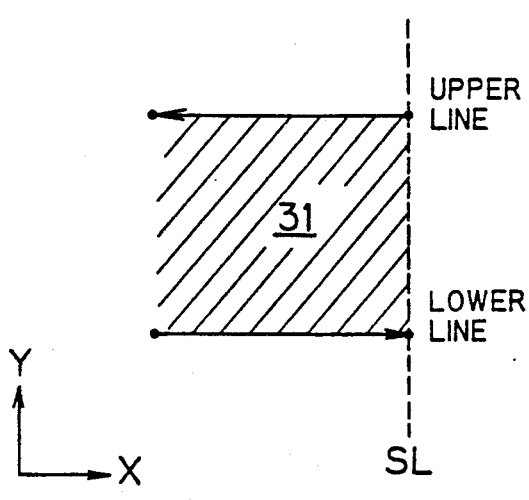
FIG. 17 is a diagram showing an upper line and a lower line.

Of the three conditions, the first condition (step S221) corresponds to the fact that a region 31 on the left side of the direction of upper and lower lines is an internal region of a reduced polygon, as shown in FIG. 17. Referring to FIG. 17, a line having larger Y-coordinates on a noted slit line SL is an "upper line".

The second condition (step S222) concerns the factor that both of upper and lower lines extend toward the left side of a noted slit line, i.e., a smaller X-coordinate side.

Figure 18:
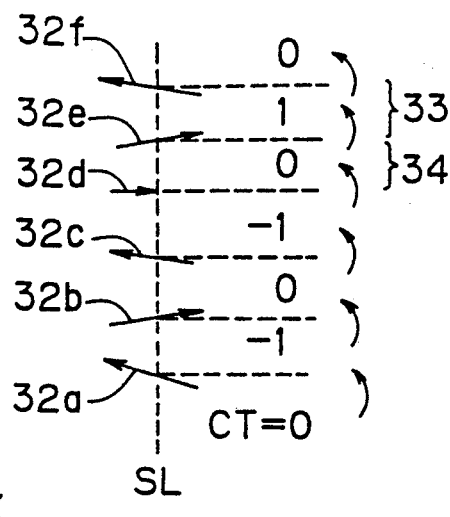
FIG. 18 is a diagram showing a black-and-white flag counter.

The third condition (step S223) is adapted to judge which interval is employed to form a convex loop when a large number of lines $32a$ to $32f$ exist on a slit line SL as shown in FIG. 18. For such judgement of the third condition, the graphic data converter 11 shown in FIG. 1 is provided with a black-and-white flag counter CT (not shown). The black-and-white flag counter CT is so formed as to detect presence of the lines $32a$ to $32f$ in order from that having smaller Y-coordinates on the slit line SL for incrementing the counter CT by "1" when the lines are rightwardly directed while decrementing the same by "1" when the lines are leftwardly directed. Thus, in the example shown in FIG. 18. the count value CT is sequentially changed from an initial value "0" as $(-1), 0, (-1), \ldots$, and becomes $(+1)$ in an interval 33. $CT=0$ in an interval 34 preceding the interval 33. Thus, it is understood that the interval 33 is not an unfilled region but a filled region, in which a convex loop must be formed.

The aforementioned line registering and loop forming routines are first performed with respect to lines other than those of "new registration" in the noted slit line (step S204). Loop formation at the step S204 includes eight cases shown in FIGS. 19D to 19K, as modes of dividing a reduced polygon in the noted slit line. Further, such condition is provided that at least one of upper and lower sides of the loops thus formed is a line having a right end point on the noted slit line. Therefore, a loop $R_a$ is formed but a loop $R_b$ is not formed in a slit line SL5 shown in FIG. 20, for example. Through provision of such condition, the number of loops can be reduced when the reduced polygon 21 is divided into a plurality of loops.

Figure 19A:
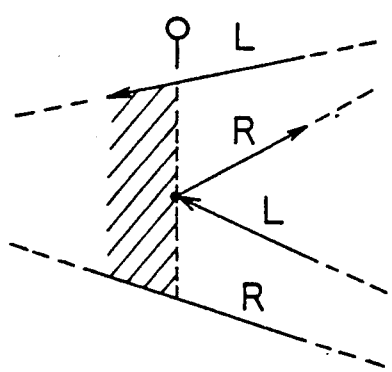
FIG. 19A-FIG. 19K are diagram showing positional relationships between slit lines and apices.
Figure 19B:
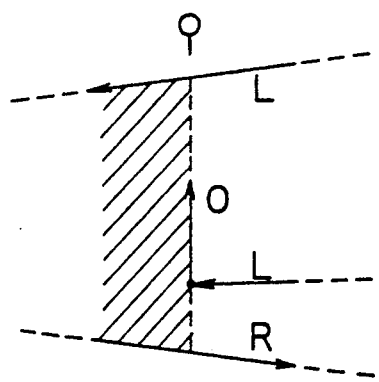
Figure 19C:
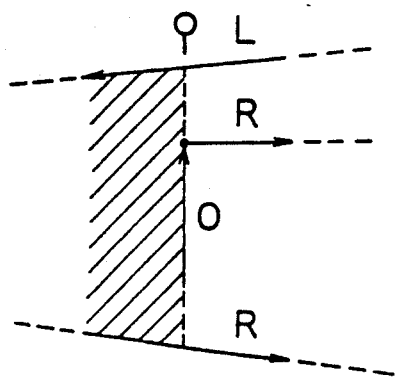
Figure 19D:
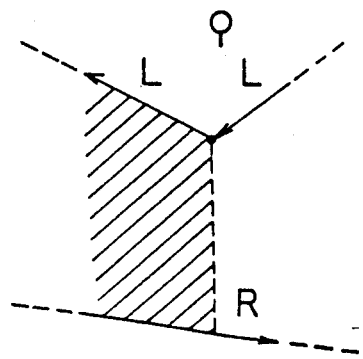
Figure 19E:
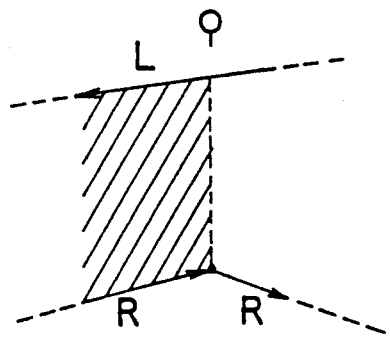
Figure 19F:
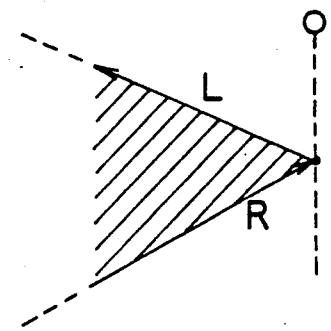
Figure 19G:
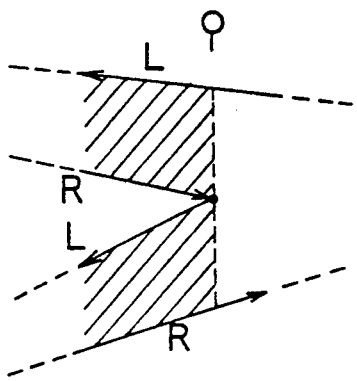
Figure 19H:
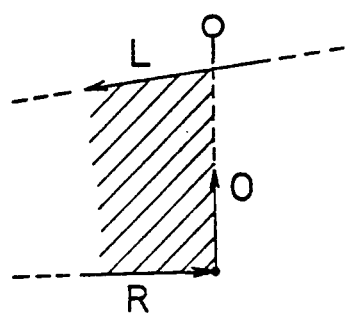
Figure 19I:
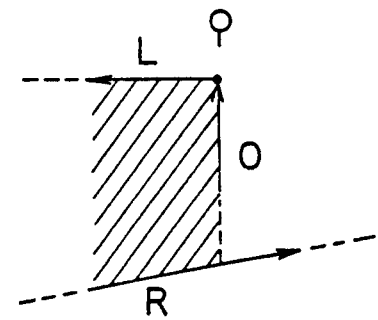
Figure 19J:
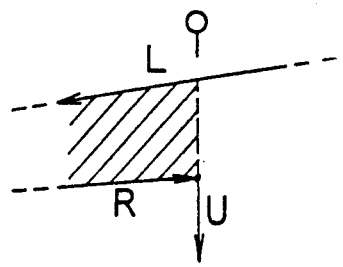
Figure 19K:
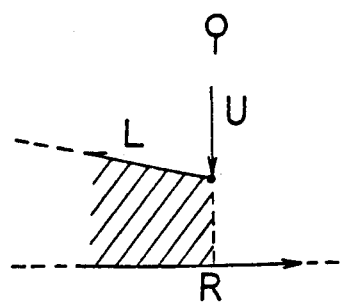

After the step S204 is completed, lines for "new registration" are registered. In this case, the newly registered lines themselves form no parts of loops, but the loops are formed by utilizing groups of other lines provided on the noted slit line (FIGS. 19A to 19C).

The loop forming routine is performed in order of slit lines SL1 to SL8 along the X-axis direction. Lines already employed for forming convex loops are deleted from the work list. However, when a loop LP1 is formed by employing a line such as a line L2 shown in FIG. 20, which extends rightwardly beyond a noted slit line SL2, a portion L2' of the line L2 present on the right side of the said slit line SL2 is left. In more concrete terms, coordinates of a start point B of the line L2 registered on the work list are changed into those of an intersection B' between the line L2 and the slit line SL2.

Figure 16B:
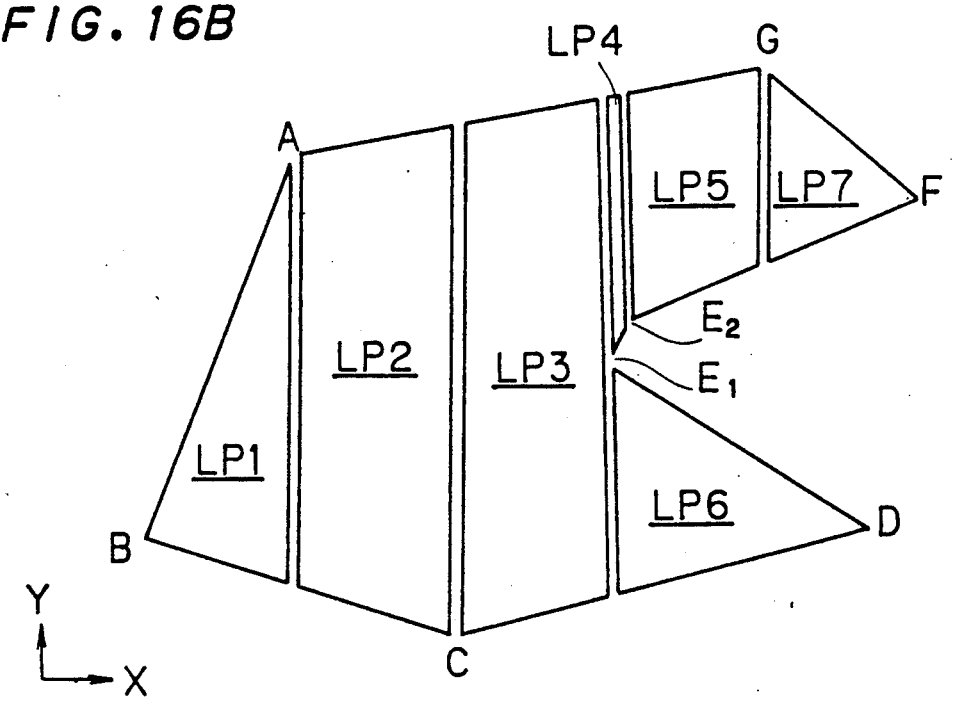
FIG. 16B is a diagram showing convex loops obtained from the reduced polygon shown in FIG. 16A.

Through such processing, the reduced polygon 21 shown in FIG. 16A is divided into the convex loops LP1 to LP7 shown in FIG. 16B, sequentially from the left side. Since the reduced polygon 21 is divided into parts through straight lines passing through respective apices of the reduced polygon 21, i.e., the slit lines SL1 to SL8, all of the loops LP1 to LP7 have triangular or convex quadrangular (square, rectangular, trapezoidal or parallelogramatic) configurations.

Figure 20:
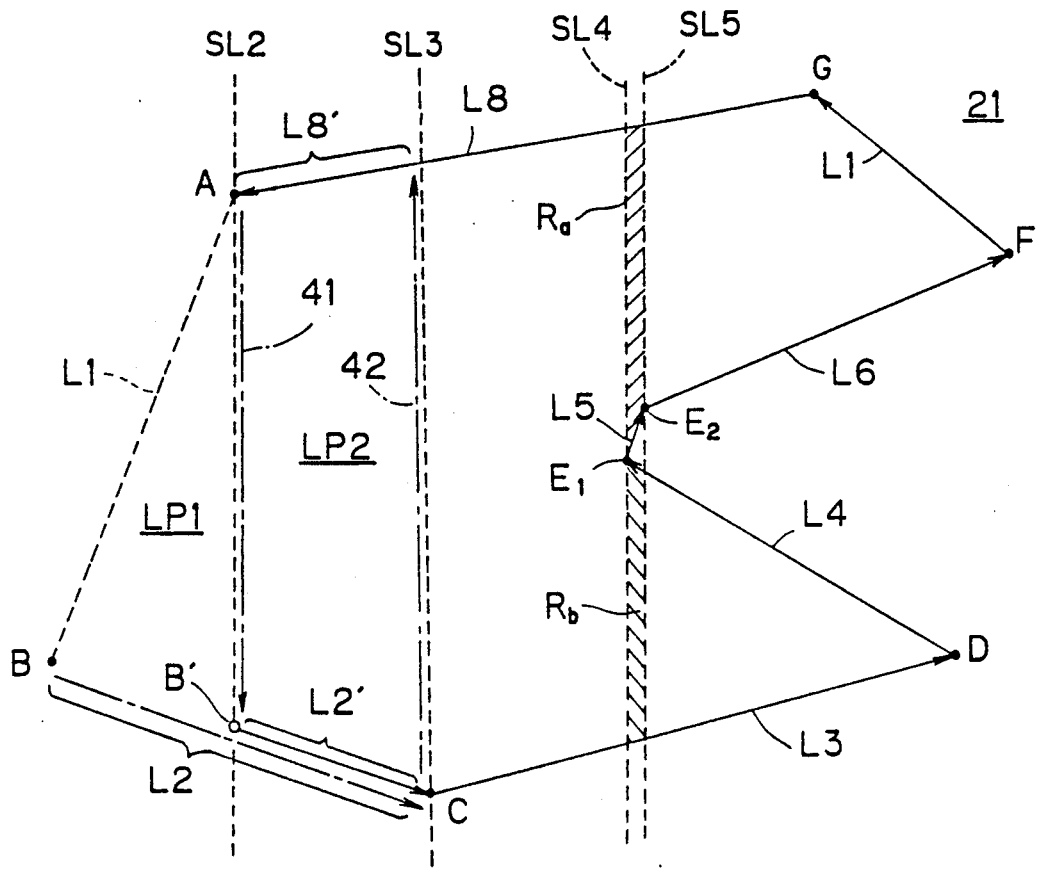
FIG. 20 is a diagram showing a reduced polygon and slit lines.

For example, the convex loop LP2 shown in FIG. 20 is formed by lines L2' and L8', which are parts of the lines L2 and L8 respectively, and lines 41 and 42, which correspond to parts of the slit lines SL2 and SL3 themselves. However, no specific calculation is required for specifying the lines 41 and 42, because start and end points of the lines 41 and 42 are specified by an end point of the line L2' or L8' and a start point of the other line L8' or L2'. Thus, the convex loop LP2 is conceptually formed by dividing the reduced polygon 21 through the slit lines SL2 and SL3 and newly adding the lines 41 and 42. In actual data processing, however, the lines 41 and 42 are automatically specified when the reduced polygon 21 is divided. Directions of the lines 41 and 42 are so decided that the same are coupled with the lines L2' and L8' to form a counterclockwise loop constituted by all the mentioned lines.

The convex loops LP1 to LP7 are sequentially divided along the direction X, and data on the convex loops once divided are not employed in processing for dividing subsequent convex loops. Further, data on lines in slit lines following a noted slit line are not required in current line formation. Therefore, it is not necessary to simultaneously register the data on all of the lines L1 to L8 on the work list, but only information on a line intersecting with the noted slit line or having an end point on the slit line may be provided on the work list. In this embodiment, therefore, a storage area, in the memory 13, capable of storing only information on a line intersecting with one slit line and that having an end point on the said slit line is sufficient for the purpose of forming the work list area. The data on the lines in the respective slit lines SL1 to SL8 are sequentially registered in this storage area, to be processed.

(C-3) Sequencing between Lines having the Same Y-Coordinates

Figure 21:
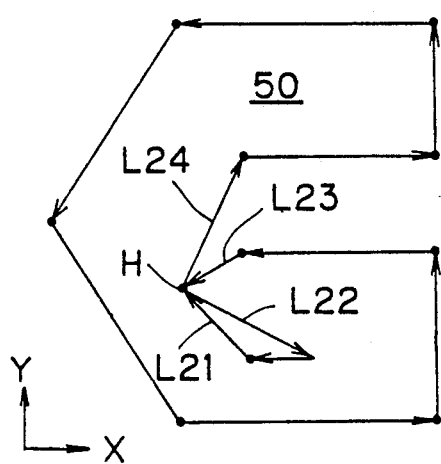
FIG. 21 is a diagram showing vectors forming a reduced polygon.
Figure 22:
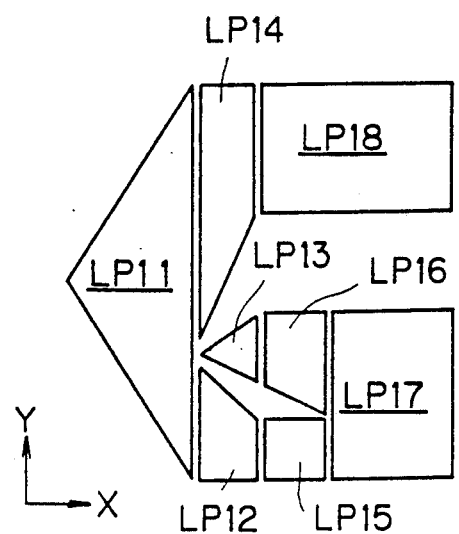
FIG. 22 is a diagram showing convex loops obtained from the reduced polygon shown in FIG. 21.

In the case of "new registration" etc., a plurality of lines having the same Y-coordinates are provided on one slit line. In this case, sequencing of the lines, i.e., sorting in the direction Y is performed on the basis of the degrees of inclination of the respective lines (step S206 in FIGS. 9A-9B). Therefore, at an apex H of a reduced polygon 50 shown in FIG. 21, for example, lines L21 to L24 are registered on the work list in this order. Thus, the reduced polygon 50 is divided into convex loops LP11 to LP18 shown in FIG. 22. Since end point coordinates of the respective lines L21 to L24 are already known, it is easy to calculate the degrees of inclination of the respective lines and compare the same with each other.

(C-4) Intersection Processing

Figure 23:
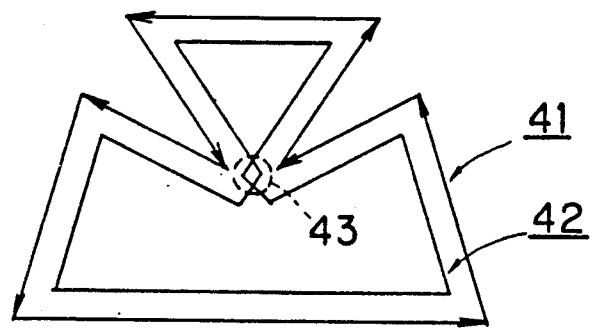
FIG. 23 is a diagram showing a reduced polygon which has an intersection region.
Figure 24:
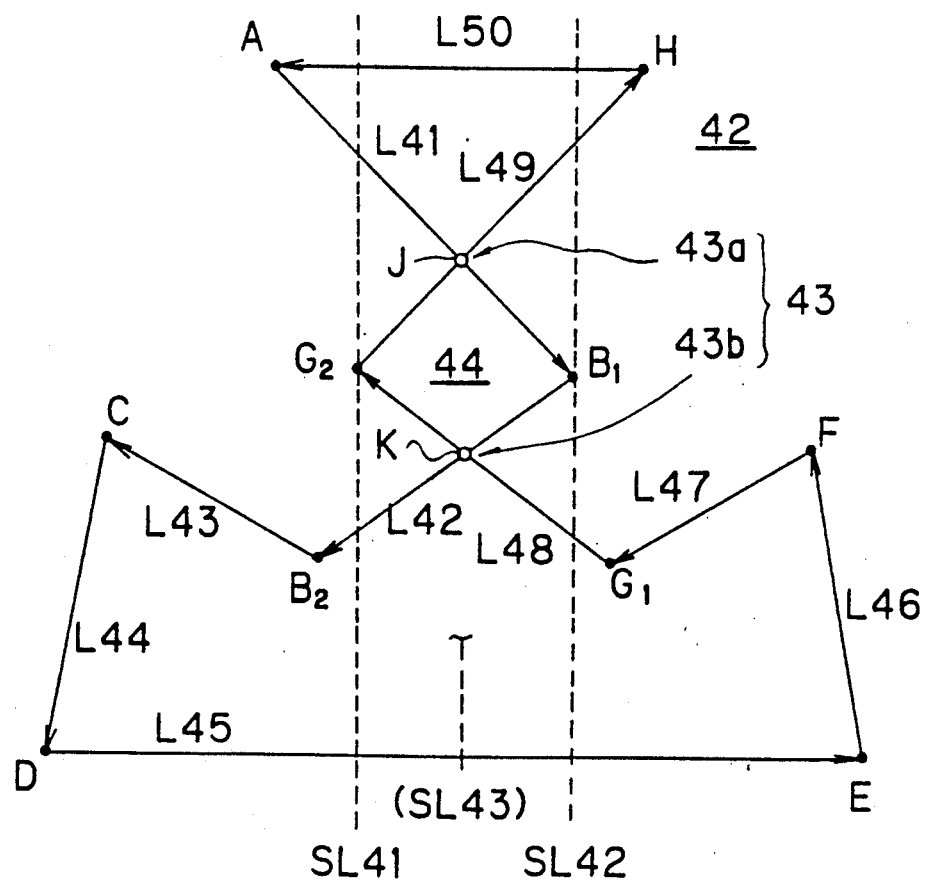
FIG. 24 is a diagram showing the reduced polygon indicated in FIG. 23 which has the exaggerated intersection region.

In obtaining a reduced polygon from an inputted polygon, when a reduced polygon 42 is produced from a polygon 41 shown in FIG. 23, for example, an intersection region 43 of border lines occurs. Referring to FIG. 24 which shows the reduced polygon 42 in detail while exaggerating the intersection region 43, the intersection region 43 has an upper intersection region 43a and a lower intersection region 43b. These intersection regions 43a and 43b exist between slit lines SL41 and SL42. Therefore, a reverse loop 44 occurs in this interval, which interferes with the processing involved in forming convex loops.

Figure 25:
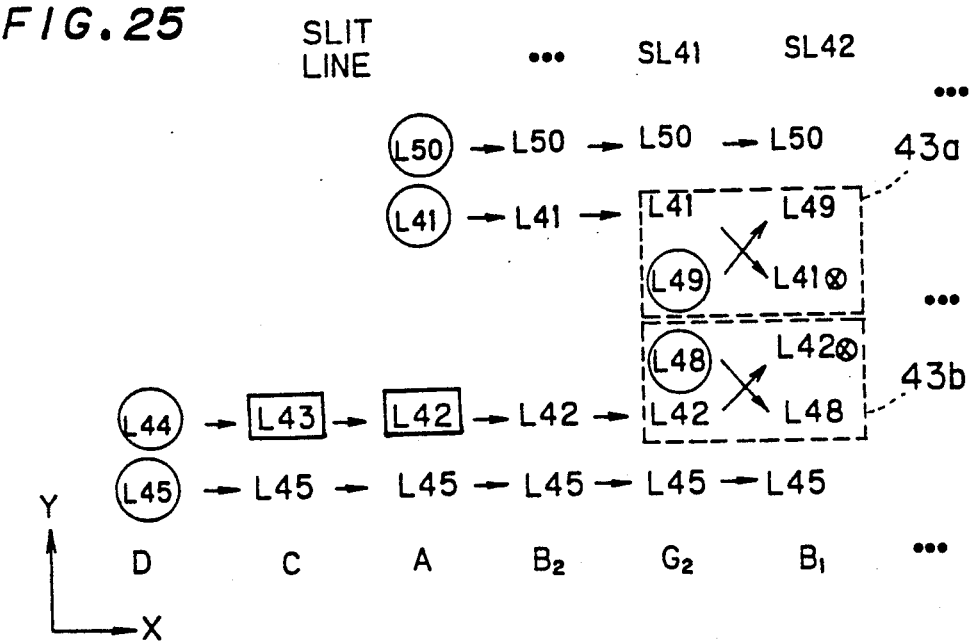
FIG. 25 is a diagram showing a process of registering line on a work list for the intersection region.
Figure 26A:
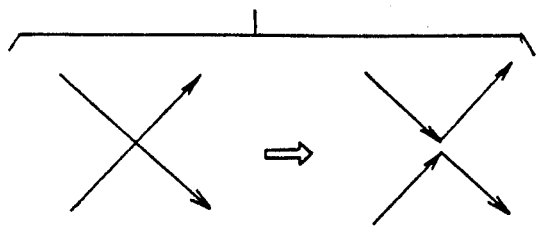
FIG. 26A-FIG. 26D are diagrams showing intersecting pairs of lines.
Figure 26B:
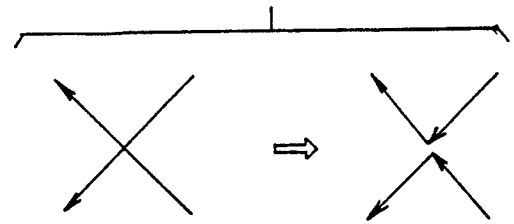
Figure 26C:
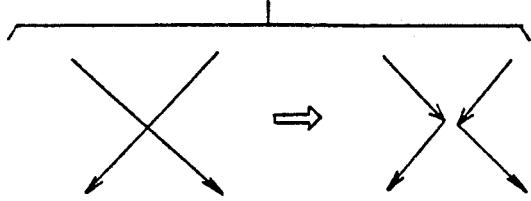
Figure 26D:
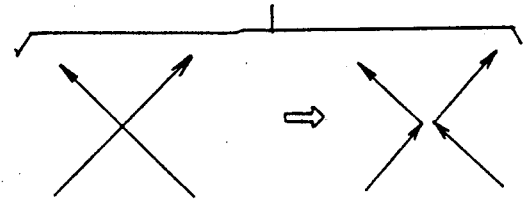

Such intersection region may be treated as follows: Referring to FIG. 25 partially showing a state of registration of respective lines L41 to L50 forming the reduced polygon 42 on the work list, the intersection regions 43a and 43b are detected in the form of an inversion in line ordering between the slit lines SL41 and SL42. More specifically, the order of lines L41 and L49 is reversed in one region while the order of lines L48 and L42 is reversed in the other region.

Figure 27:
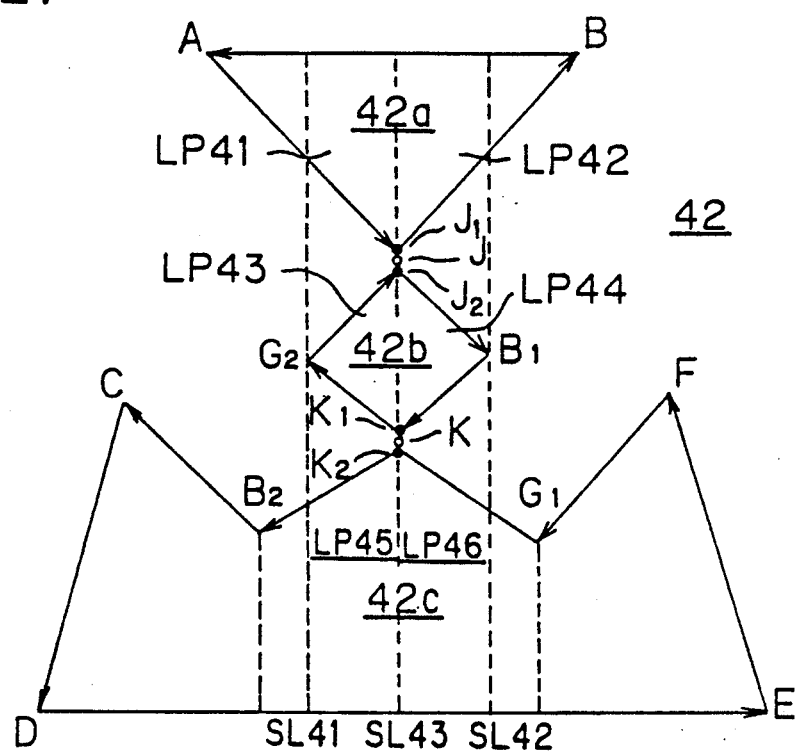
FIG. 27 is a diagram showing the reduced polygon which has the corrected intersection region.

Then, coordinates of intersections J and K (FIG. 24) between the inverted lines are obtained by calculation, to set a new slit line SL43 which passes through the intersections J and K. Further, the intersecting pairs of lines are divided into two groups of two bent lines in response to directional relation between the lines at the intersections J and K, as shown in FIGS. 26A-26D. Thus, each intersection is divided into two apices. As to the newly generated apices, registration/deleting of lines on/from the work list and formation of loops by the same are performed similarly to the processing of normal apices. When this rule is applied to the intersections J and K shown in FIG. 24, loops LP41 and LP45 are formed by loop formation on the new slit line SL43, as shown in FIG. 27. No loop LP43 is formed since the condition of loop formation at the step S221 is not satisfied. Similarly, no loop LP44 is formed on the slit line SL42 but loops LP42 and LP46 are formed. That is, the intersections J and K are divided into apices $J_1$, $J_2$, $K_1$ and $K_2$, whereby the reduced polygon 42 is divided into three closed polygons 42a to 42c. Within these, the closed polygon 42b is a clockwise polygon and hence no convex loop is formed by the closed polygon 42b as a region to be filled. Thus, only convex loops divided from the closed polygons 42a and 42c are treated as regions to be filled, thereby solving the problem of a reverse loop caused from the intersection region 43.

Figure 28:
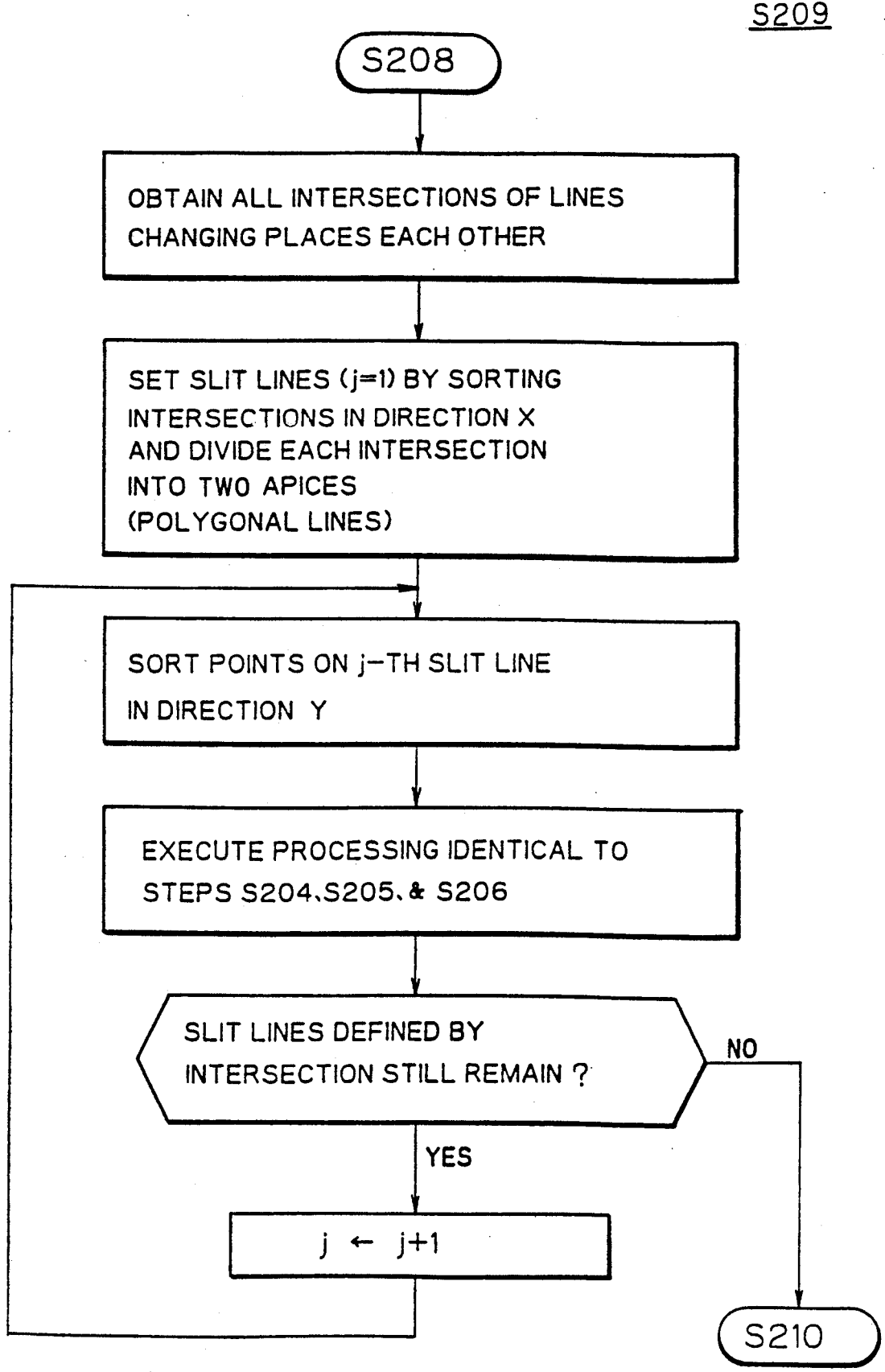
FIG. 28 is a flowchart showing details of the step S209 in FIG. 9, FIG. 29A-FIG. 29E are diagrams showing different types of configurations of convex loops.
Figure 29A:
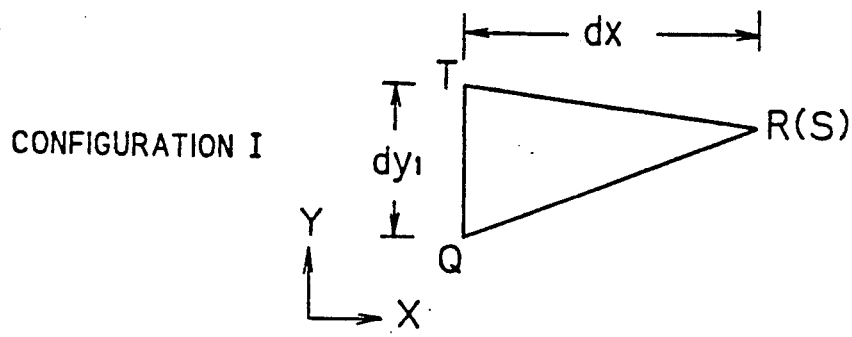
Figure 29B:
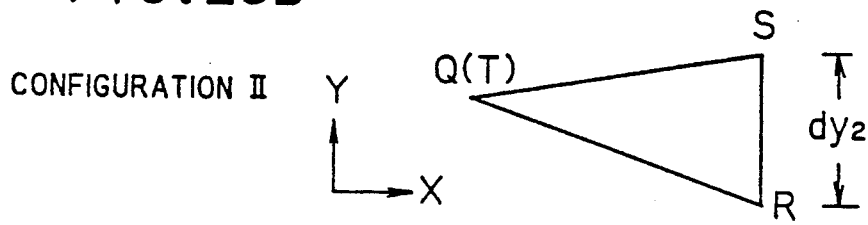
Figure 29C:
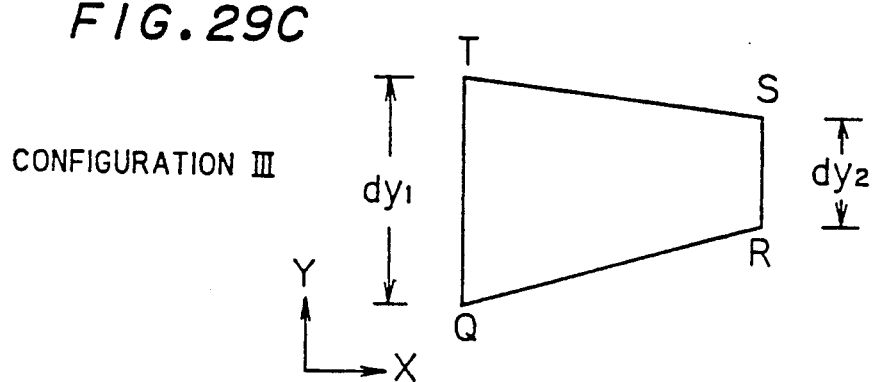
Figure 29D:
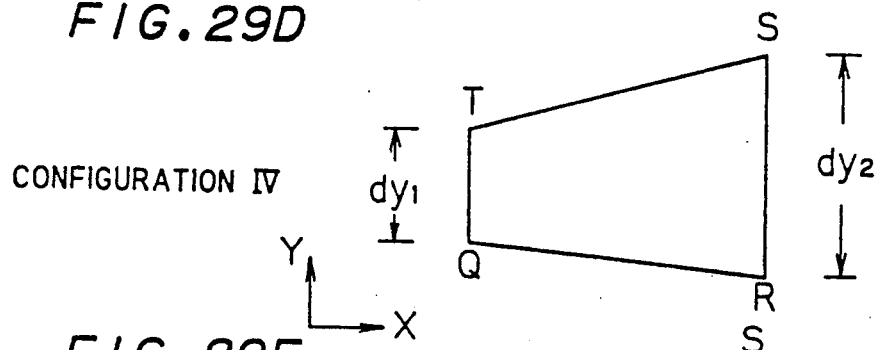
Figure 29E:
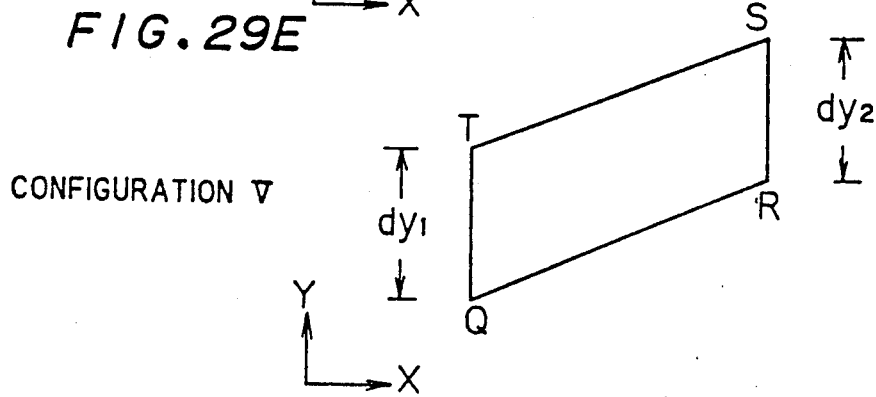

The above processing is also shown at steps S207 to S210 in FIG. 9, while FIG. 28 shows the detail of the step S209. It is noted that the step S208 shows processing of returning to a preceding slit line, and loop formation is performed at the step S209 while performing intersection processing between adjacent slit lines.

D. Generation of Filling Vector Groups

(D-1) Internal Region

After the reduced polygon is divided into convex loops through the aforementioned process, filling vector groups are generated to fill up the respective convex loops. The configuration of each convex loop, which is obtained by dividing the reduced polygon along the straight line passing through the apex of the reduced polygon and is parallel to the direction Y, i.e., slit lines, belongs to any one of five configuration types I to V shown in FIGS. 29A-29E. In order to detect the longitudinal direction of each convex loop, lengths of each convex loop along the directions X and Y are first expressed as dx and ($dy_1$, $dy_2$). The values $dy_1$ and $dy_2$ represent lengths of two sides (vertical sides) which are parallel in the direction Y. A larger one of the lengths $dy_1$ and $dy_2$ is expressed as DY (step S301 in FIG. 30). At a step S303, a judgement is made as to which one the dx or the DY has a greater value, thereby recognizing the longitudinal direction of the convex loop. When the length DY exceeds dx and the convex loop is longitudinal along the direction Y, a longitudinal filling vector group is generated at a step S304, while an oblique or transverse filling vector group is generated in a reverse case.

Figure 31A:
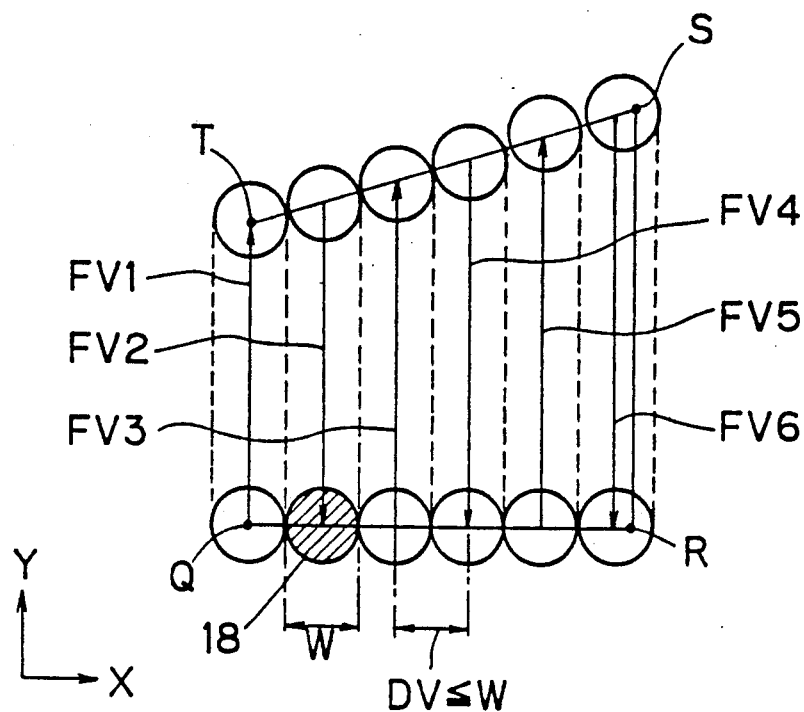
FIG. 31A is a diagram showing a positional relationship between filling vectors and a reduced polygon.

FIG. 31A shows a longitudinal filling vector group for a quadrangular convex loop. Generated first is a vector FV1, which starts from an apex Q having the smallest X- and Y-coordinates within apices of a convex loop QRST. The vector FV1 ends at the point T. Then, a vector FV2, which is parallel and inverted to the vector FV1 and has a center separated from that of the vector FV1 by a distance within the light spot diameter W (hereinafter "within" is omitted), is generated. This vector FV2 has a start point which is provided on a side TS and an end point on side QR. Thereafter, in a similar manner, vectors FV3 to FV6 having mutual distances $DV \leq W$ (hereinafter less-than sign "<" is omitted) are sequentially generated, to obtain a vector group for filling up the internal region of the convex loop QRST. This generation of the vector group is stopped when adding a further vector would pass the side SR.

Figure 31B:
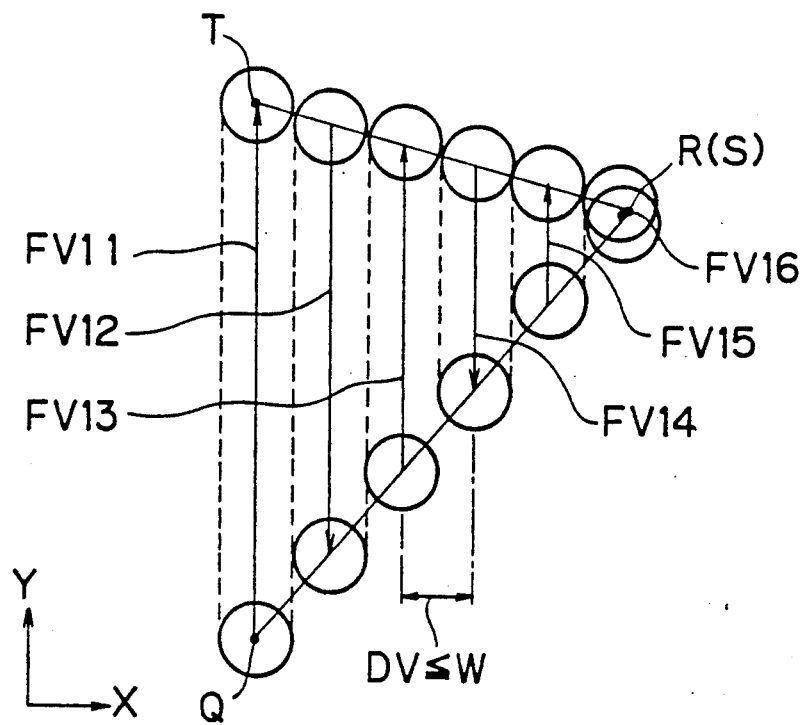
FIG. 31B is a diagram showing another positional relationship between filling vectors and a reduced polygon.

As to a convex loop having a triangular configuration, vectors FV11 to FV16, which are parallel in the direction Y, are also sequentially generated alternately in reverse directions, as shown in FIG. 31B.

Figure 32B:
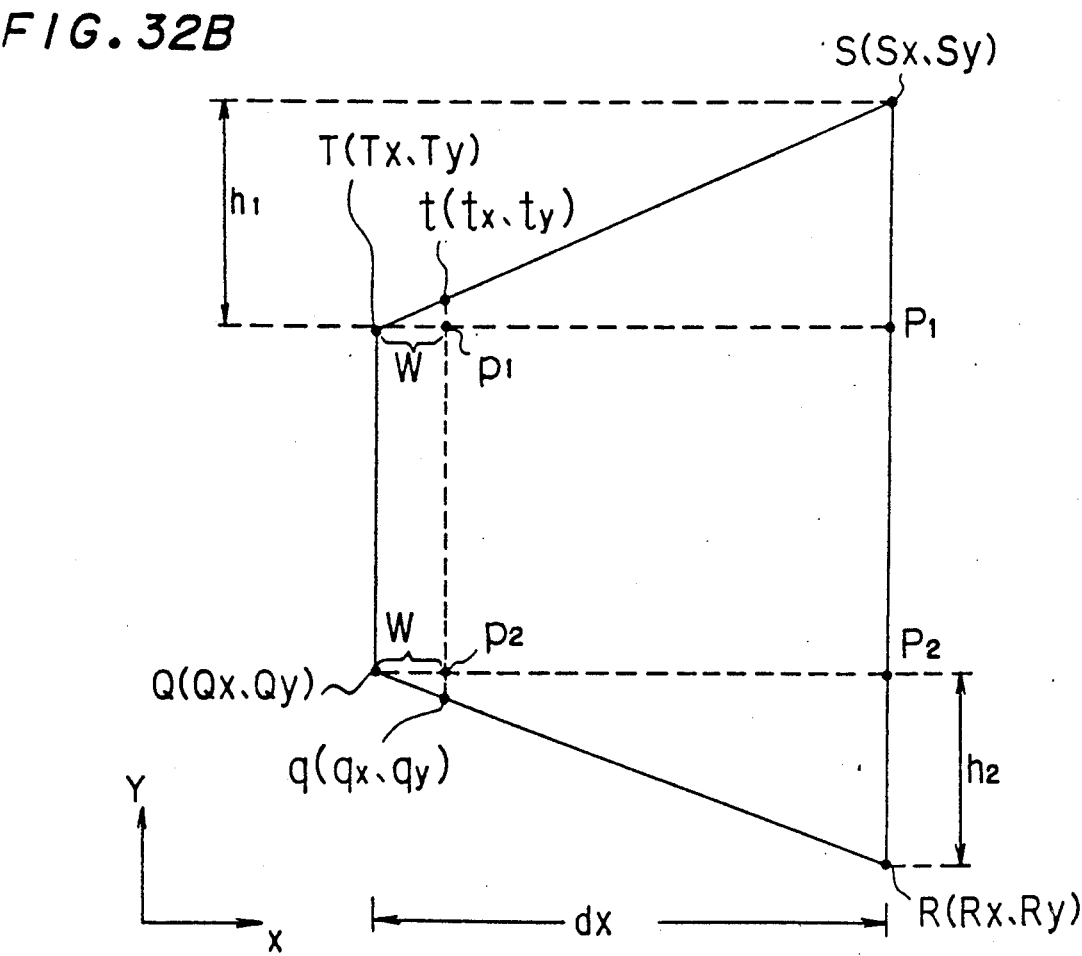
FIG. 32B is a diagram showing a calculation principle of a longitudinal filling vector group.
Figure 32A:
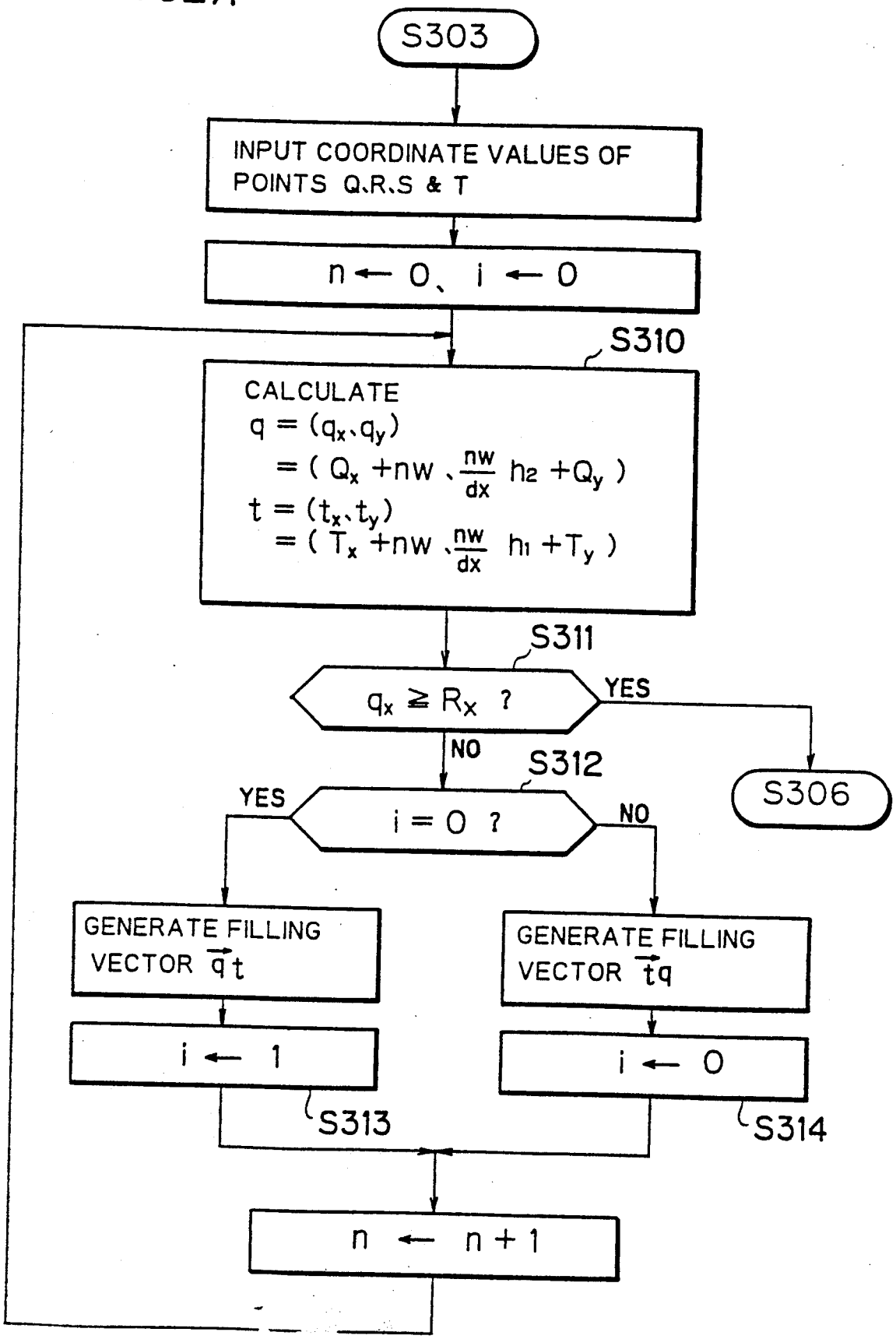
FIG. 32A is a flowchart showing a routine for generating a longitudinal filling vector group.

FIG. 32A shows a routine for implementing the processing of generating the filling vector groups. As to a quadrangular convex loop, for example, a segment qt (FIG. 32B) specifying filling vectors can be derived from the fact that triangles $TP_1S$ and $Tp_1t$ and triangles $QP_2R$ and $Qp_2q$ are similar to each other. Namely, degrees of inclination of respective segments TS and QR are provided by ($h_1$/dx) and ($h_2$/dx), whereby coordinates of end points q and t of the segment qt which is separated from a line TQ by a distance nW, where n represents zero or a positive integer, can be easily calculated on the basis of the coordinates of apices T and Q and the aforementioned degrees of inclination. Referring to FIG. 32A, the step S310 shows such a calculation process. The step S311 determines whether a filling vector reaches a side SR, and steps S312 to S314 are adapted to generate vectors in alternate directions. A filling vector group thus generated is outputted at a step S306 shown in FIG. 30, in order to perform the processing at the step S4 shown in FIG. 3.

Figure 30:
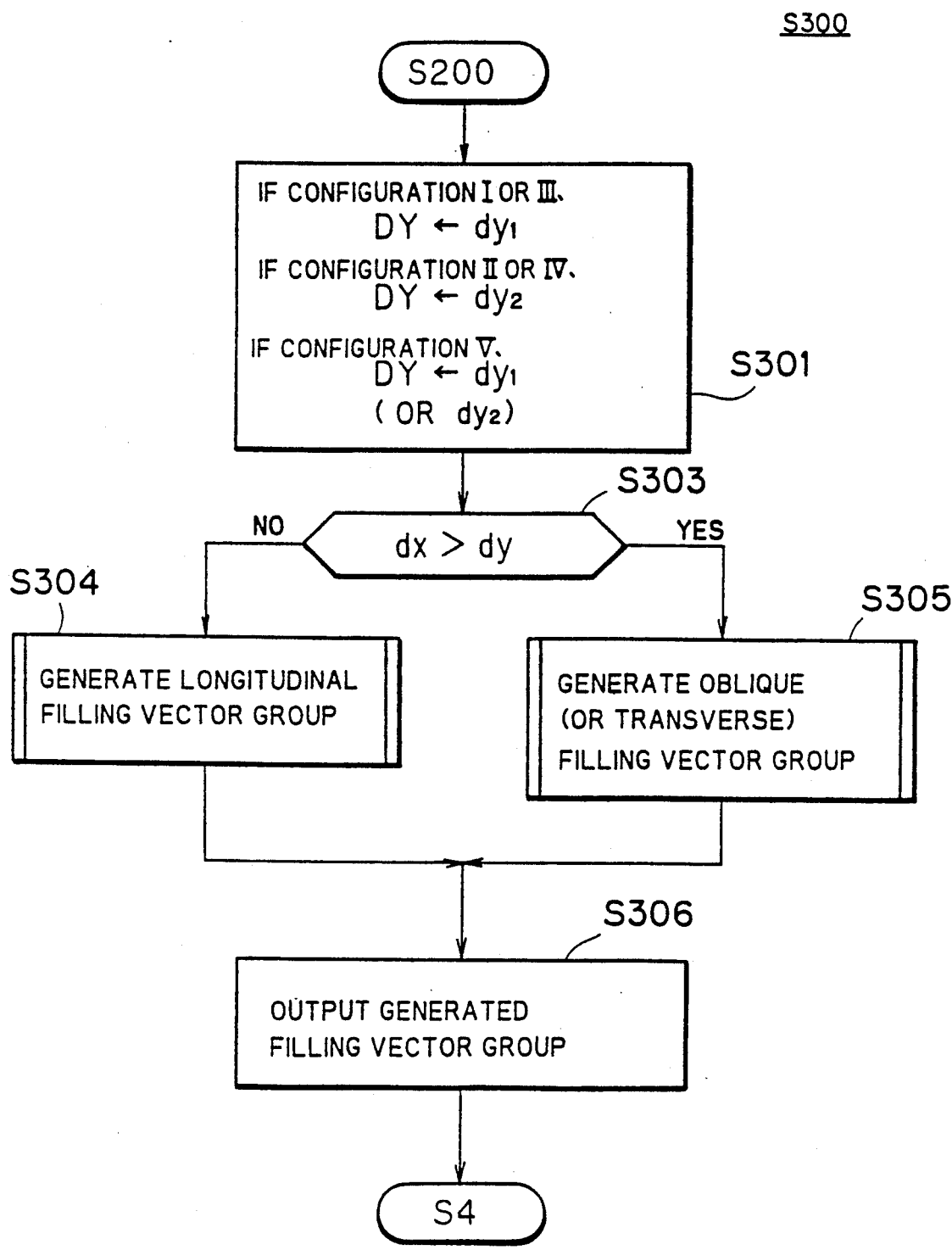
FIG. 30 is a flowchart showing a routine for detecting the longitudinal direction and generating a filling vector group.
Figure 33:
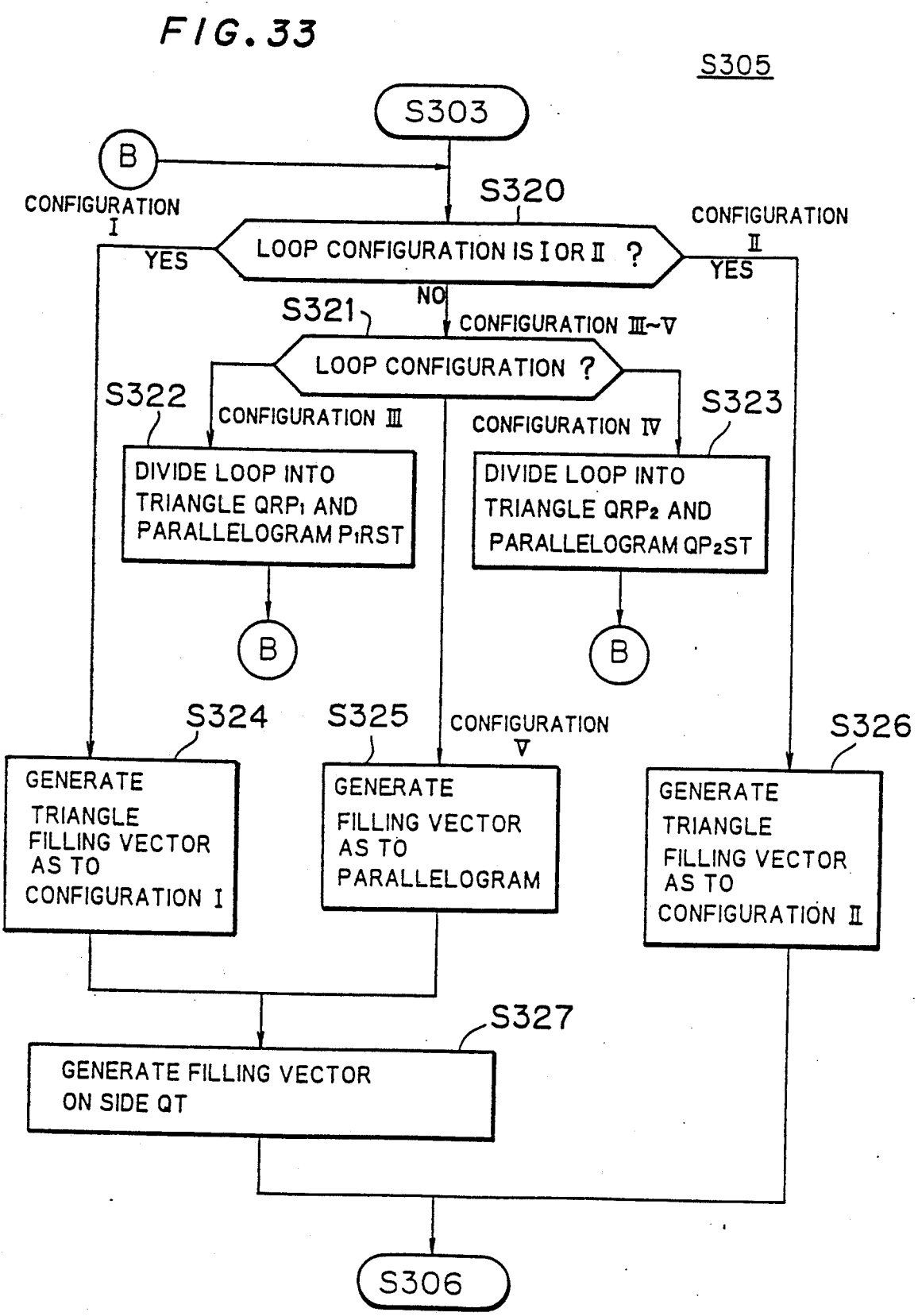
FIG. 33 is a flowchart showing a routine of generating filling vectors as to an oblique or transverse direction.
Figure 34A:
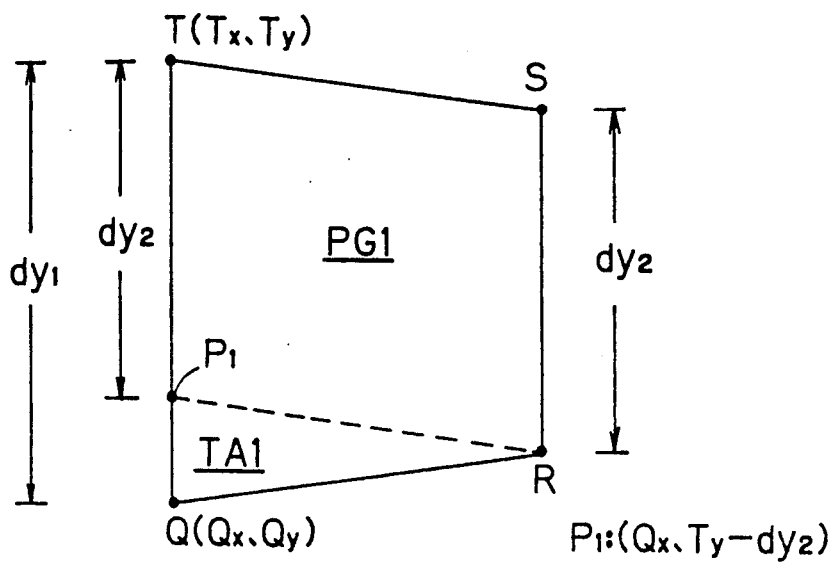
FIG. 34A is a diagram showing a convex trapezoid.
Figure 34B:
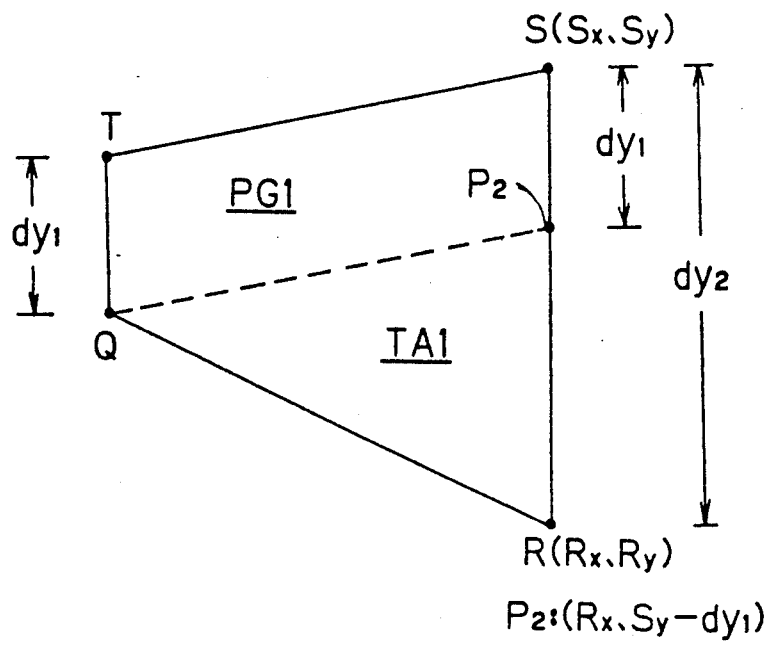
FIG. 34B is a diagram showing another convex trapezoid.

On the other hand, FIG. 33 shows the processing details for generating an oblique filling vector group at the step S305 in FIG. 30. The configuration of each loop is judged at steps S320 and S321, and the loop is divided into a triangle and a parallelogram when the same is in the configuration III or IV (FIGS. 29C and 29D) (steps S322 and S323 of FIG. 33 and FIGS. 34A and 34B). In the examples shown in FIGS. 34A and 34B, loops are divided into parallelograms PG1 and triangles TA1. When the process returns to step S320 from step S322 or S323, loops to be processed are, therefore, in the configurations I, II and V.

Figure 34C:
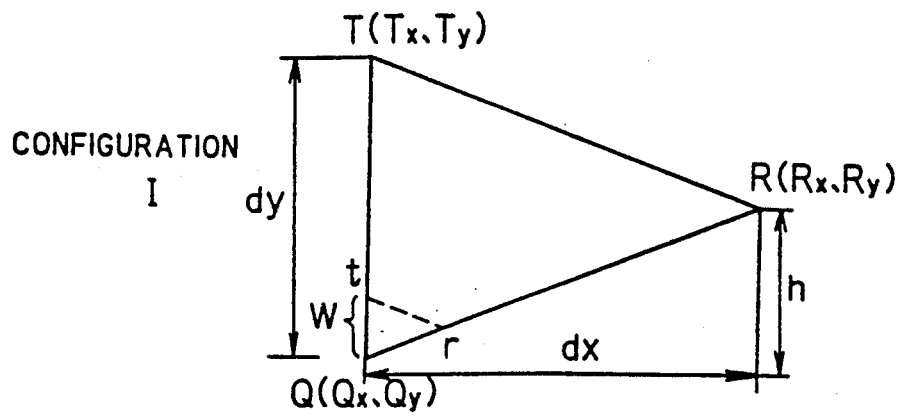
FIG. 34C is a diagram showing a triangle.
Figure 34D:
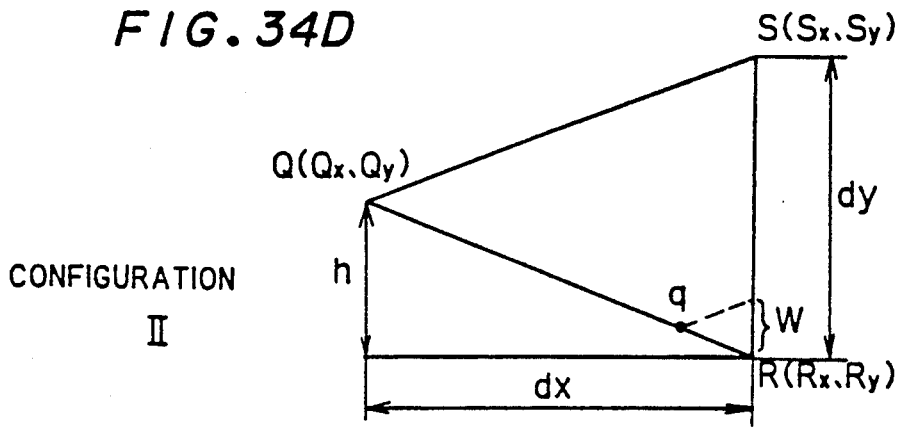
FIG. 34D is a diagram showing another triangle.
Figure 35:
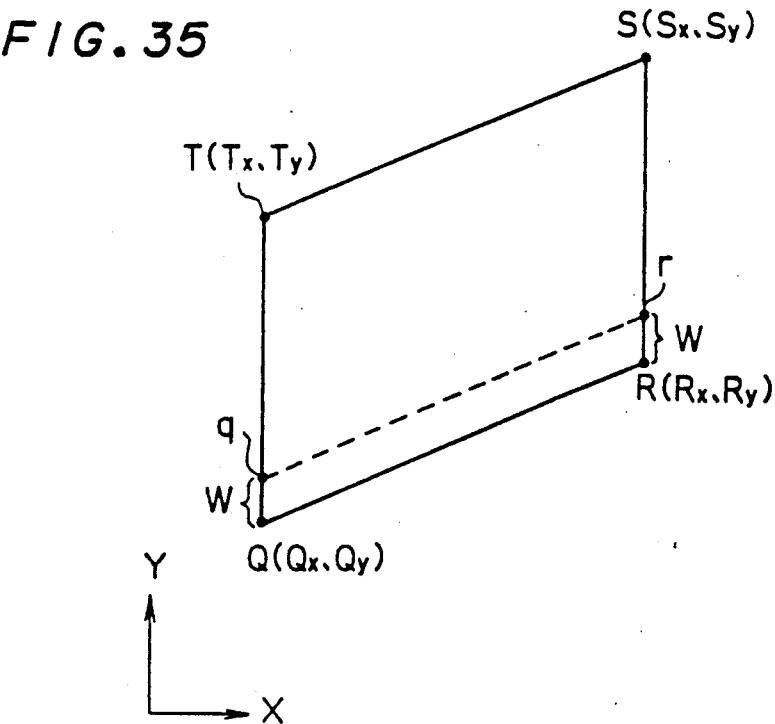
FIG. 35 is a diagram showing a parallelogram.

The loops having the configurations I, II and V are respectively subjected to the process of generating filling vectors at steps S324, S326 and S325. With respect to the configuration V, i.e., the parallelogram, a segment qr parallel to hypotenuses QR and TS is obtained as to n=0, 1, 2, ... as shown in FIG. 35, thereby to generate filling vectors. With respect to the configurations I and II, i.e., the triangles, a segment tr parallel to a hypotenuse TR is obtained for the configuration I and a segment qs parallel to a hypotenuse QS is obtained for the configuration II for n=0, 1, 2, ... respectively as shown in FIGS. 34C and 34D, thereby to generate filling vectors.

As to the configurations I, II and V, therefore, vectors such as parallel arrows in alternate directions shown in respective ones of FIGS. 36A to 36C are obtained. The interdistance DV between each pair of adjacent vectors along the direction Y is the same as the light spot diameter W. The loops considered herein have larger lengths along the direction X than those along the direction Y, and hence the numbers of filling vectors are reduced as compared with the case of filling these loops along only longitudinal filling vectors since filling loci are indicated by these oblique filling vectors having components in the direction X. When the side TS and/or QR is parallel to the X-axis, the routine shown in FIG. 33 is adapted to generate a filling vector group in the transverse direction, i.e., in the direction X.

If the mechanism for the photoplotter 15 is such that the locus of the light spot 18 is varied when the exposure head 16 moves obliquely, directions of filling vectors may be determined only by properly using the two directions of the longitudinal and transverse directions. In this case, no oblique filling vectors are generated but processing identical to the rule for generating the longitudinal filling vector group may be alternatively performed by transversely changing the direction of the vectors.

(D-2) Boundary Region

Figure 37:
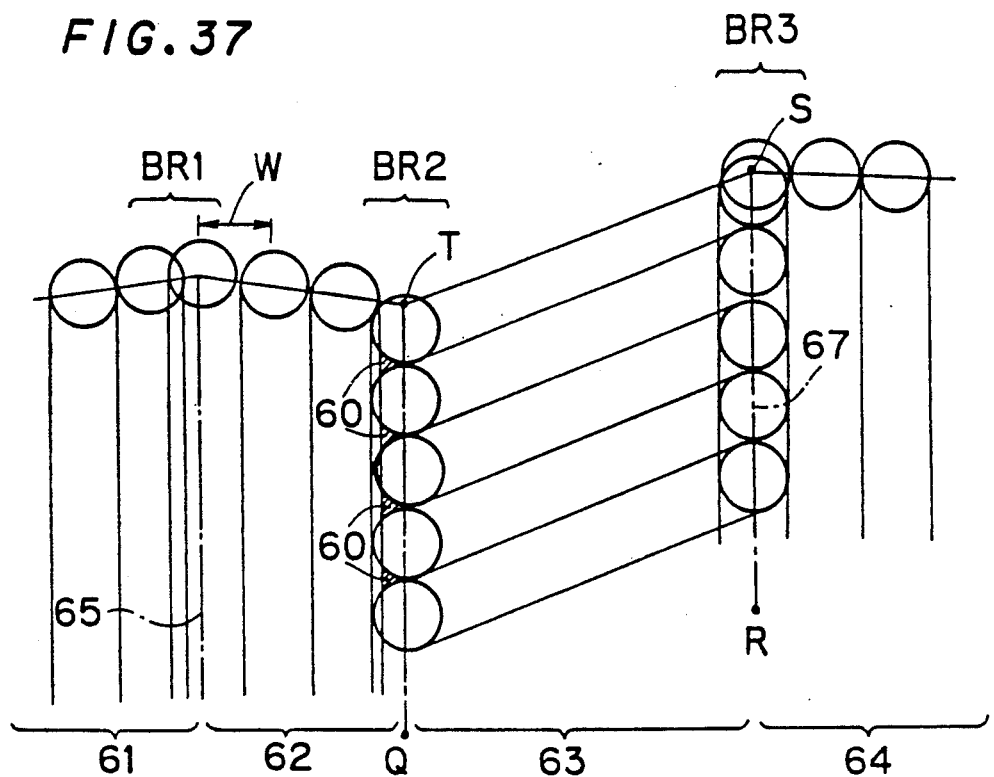
FIG. 37 is a diagram showing a boundary region filling correction.

When a loop 63 to be filled by an oblique filling vector group is adjacent on its right to a loop 62 which is filled by a longitudinal filling vector group, there is a possibility that areas 60 within a boundary region BR2 therebetween will be left unexposed as shown in FIG. 37. This is because no longitudinal filling vectors may be present in the vicinity of a right side TQ of the loop 62, since the width of the loop 62 along the direction X is not necessarily an integer multiple of the light spot diameter W. Therefore, single longitudinal filling vectors (not shown) along the sides TQ shown in FIGS. 36A and 36C are generated at a step S327 of FIG. 33. Thus, the areas 60 shown in FIG. 37 are filled from the side of loop 63.

Such boundary region filling correction may be performed only in a line TQ corresponding to the left side of the loop 63 for generating oblique and transverse vectors. This is because filling vectors are already generated in the loops 62 and 64 for generating longitudinal vectors along lines 65 and 67 forming the left sides thereof, and hence no unfilled areas are present in boundary regions BR1 and BR3.

E. Generation of Filling Vector Groups as to Closed Curve

Figure 38:
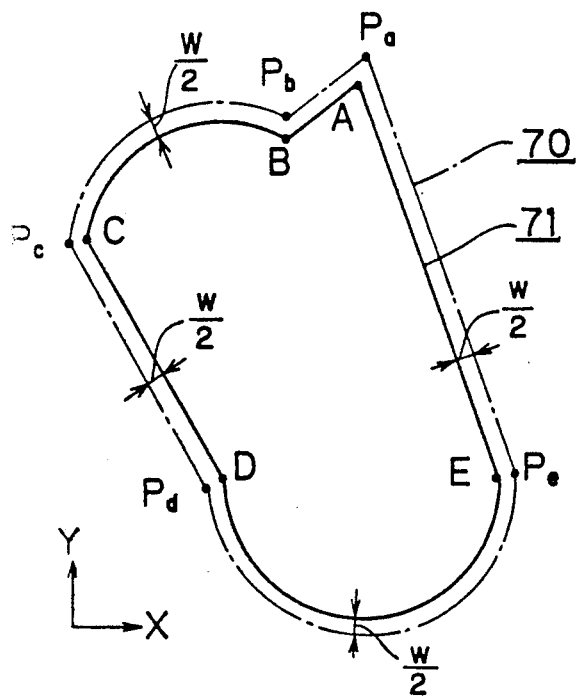
FIG. 38 is a diagram showing a closed curve and a reduced curve.
Figure 39:
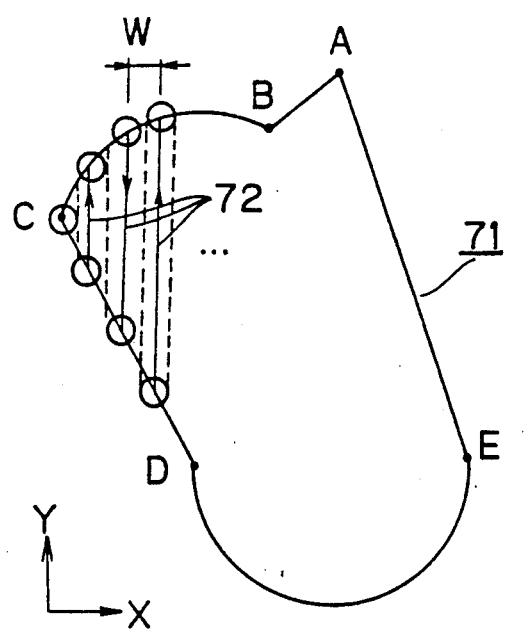
FIG. 39 is a diagram showing traces of a light spot in the reduced curve shown in FIG. 38.

When a closed curve is inputted, filling vector groups are generated at the step S3 in FIG. 3. With respect to a closed curve 70 shown in FIG. 38, for example, the border lines thereof are inwardly reduced by (W/2), to produce a reduced curve 71. Then, a group 72 of alternate parallel vectors, which are at intervals W, are generated. With no regard to the configuration of the reduced curve 71, the alternate parallel vector group 72 is longitudinally parallel in the direction Y. Additional filling vectors (not shown) may be generated along the border lines of the reduced curve 71. In this embodiment, no division into convex loops and no process of deciding filling vector directions depending on longitudinal directions of convex loops are applied to the closed curve.

F. Process of Filling Up Graphic Internal Region with Exposure Traces

The filling vector groups generated in the aforementioned manner are converted into Gaver format filling data, and supplied to the photoplotter 15. The filling data are a series of data obtained by performing sequencing for every graphic in a chain system as to groups of vector start point coordinates and vector end point coordinates expressing respective filling vectors. The sequenced series of data are command information for moving the exposure head 16. The light spot 18 from the exposure head 16 is driven to run on the photosensitive material 17 while moving its center along the filling vectors, thereby filling the internal region of the graphic. Referring to FIG. 31A, for example, the light spot 18 runs alternately in reverse directions while sequentially going on and off along the vectors FV1 to FV6. Since the polygon is divided into the convex loops, no sorting of the vectors along the direction Y is required for unfilling the concave portion thereof. Further, since the light spot 18 is moved in longitudinal directions of the respective loops or directions close to the same, the number of times of moving the light spot 18 and rotation for on-off control thereof is reduced. Thus, the exposure process is completed in a short time.

G. Modifications

(G-1) Modification 1

Figure 40A:
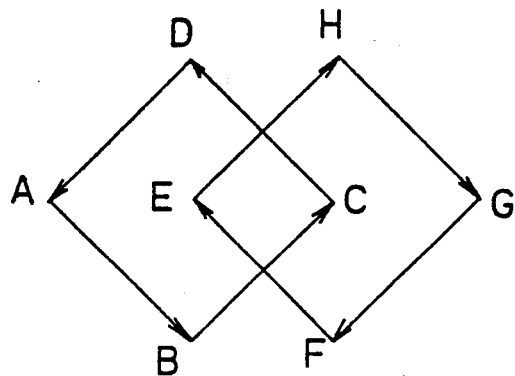
FIG. 40A is a diagram showing two quadrangles overlapping each other.
Figure 40B:
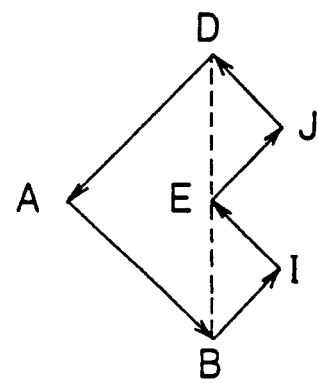
FIG. 40B is a diagram showing a clipped polygon based on the two quadrangles shown in FIG. 40A.

As shown in FIG. 40A and FIG. 40B, the internal region of a polygon ABIEJD, which is obtained by deleting an overlapping portion of quadrangles ABCD and EFGH from the quadrangle ABCD, can also be correctly filled since the above described conditions for convex loop formation and the routine as to intersection processing are employed.

(G-2) Modification 2

Figure 41A:
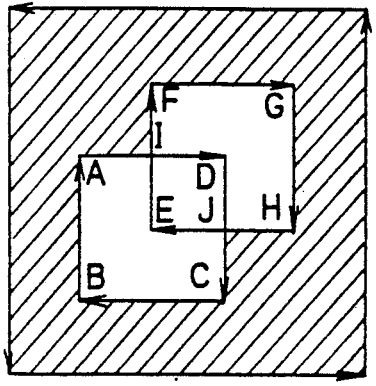
FIG. 41A is a diagram showing a reduced polygon which has vertical lines.
Figure 41B:
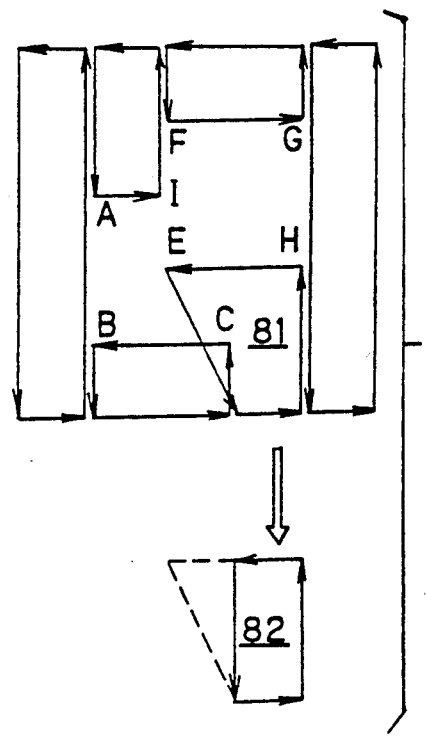
FIG. 41B is a diagram showing convex loops and a corrected convex loop of the reduced polygon shown in FIG. 41A.

In the aforementioned embodiment, no vertical lines are registered on the work list in dividing the reduced polygon into convex loops. In a reduced polygon shown in FIG. 41A etc., therefore, presence of an intersection I itself is not detected upon intersection processing and hence, as the result, loop formation is inevitably performed while disregarding that the point I is an intersection, as shown in FIG. 41B. In order to compensate for such a situation, correction may be performed to commonly define X-coordinates of end points of upper and lower sides of each loop by those of the end points of shorter ones of the sides. Thus, a loop 81 is corrected to a desired loop 82. No problem is caused when such correction is generally performed on respective loops. This is because the X-coordinates of the respective end points of the upper and lower sides must be equal to each other since the reduced polygon is divided by slit lines which are parallel in the direction Y.

(G-3) Modification 3

The aforementioned embodiment is so formed as to recognize the region in which the count value CT of the black-and-white flag counter is "1" as that to be filled. In a polygon shown in FIG. 42A, therefore, a region 85 defined by the overlapping of a plurality of counterclockwise polygons is not regarded as required to be filled. If such a region 85 is also to be filled, i.e., when all of logical sum regions of respective internal regions of a plurality of counterclockwise polygons are to be filled, the procedure of the flow chart shown in FIG. 15 may be changed into that of a flow chart shown in FIG. 43.

Figure 42A:
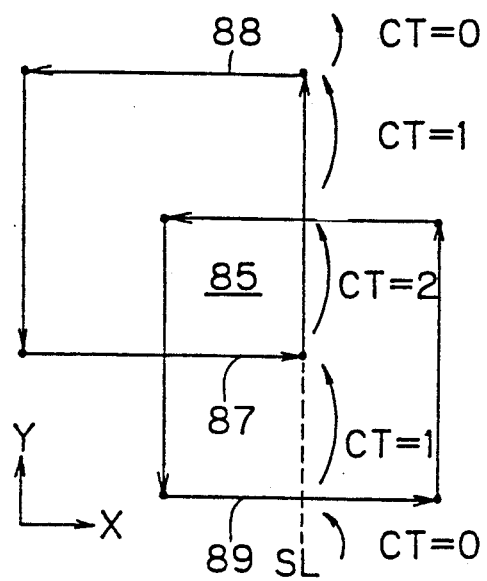
FIG. 42A is a diagram showing two quadrangles which produced an "AND" region.
Figure 43:
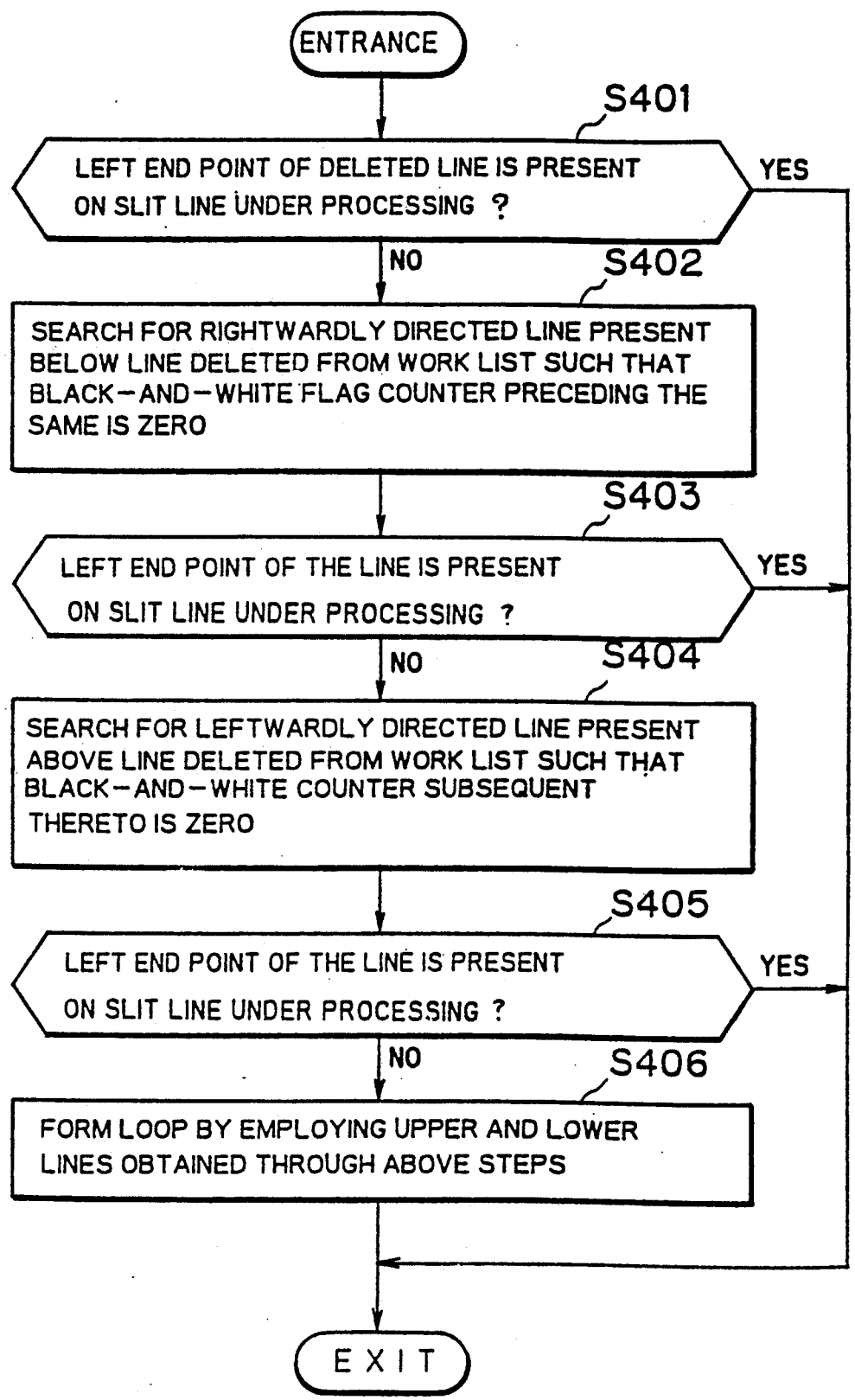
FIG. 43A is a flowchart showing a modification of a loop forming processing.

Consider a case where processing is performed on a slit line SL in FIG. 42A. A line 87 is deleted in the slit line SL, and in such deletion, a judgement is made as to whether or not the line 87 has a finite length at a step S401 shown in FIG. 43. If the full length of the line 87 is already employed for forming another loop, a judgement of "no" is made at the step S401, while another line 89 is detected at a step S402 if the judgement is "yes".

Figure 42B:
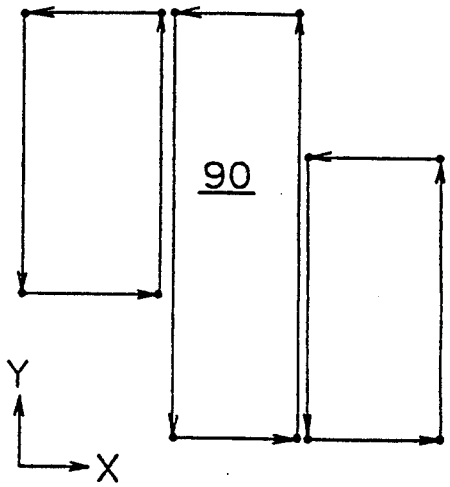
FIG. 42B is a diagram showing convex loops obtained from the graphic shown in FIG. 42A.

When it is confirmed that the full length of the line 89 is not already employed for forming another line at the step S403, a line 88 is detected at a step S404. If a judgement of "yes" is made at a step S405, a loop having the lines 88 and 89 as upper and lower lines is formed (step S406). As the result, a convex loop 90 as shown in FIG. 42B is obtained.

(G-4) Modification 4

Figure 44:
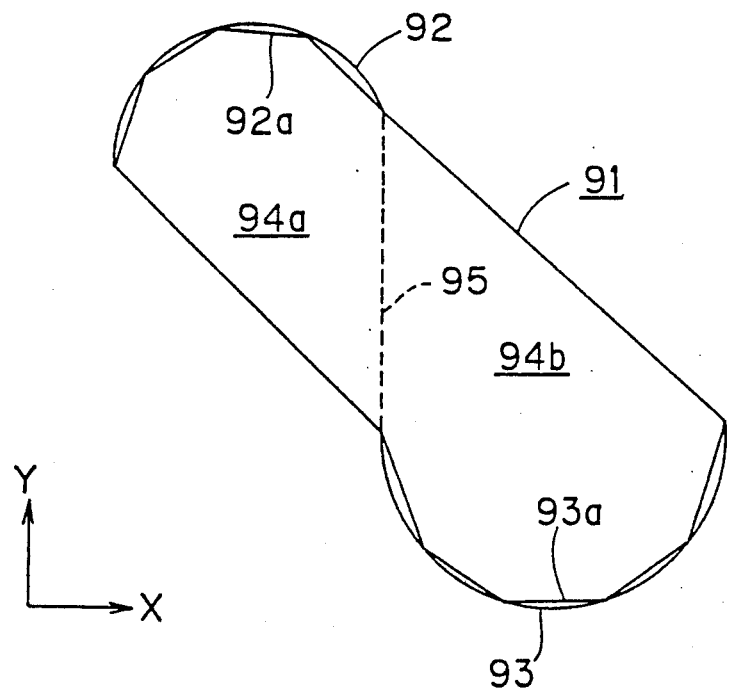
FIG. 44 is a diagram showing an approximate polygon of closed curve portions.

Filling vectors may be generated in response to the feature of the present invention also as to a closed curve, by approximating the closed curve by a polygon and applying the present invention to the polygon. With respect to a closed curve 91 shown in FIG. 44, for example, circular arc portions 92 and 93 may be approximated by polygonal lines 92a and 93a respectively, thereby to obtain a polygon which is approximate to the closed curve 91.

Pitches of the polygonal lines 92a and 93 are preferably small in order to improve accuracy of approximation. In this case, however, a large number of convex loops are generated when the approximate polygon is divided into convex loops, which increases processing time. In order to solve this problem, the number used for dividing the approximate polygon into convex loops may be reduced. For example, the number of convex loops is reduced by dividing the approximate polygon of FIG. 44 convex loops 94a and 94b only by a straight line 95. A closed curve generally includes a circular or circular arc line, and hence it is possible in most cases to divide the same into relatively large loops which include no concave portion.

(G-5) Modification 5

The present invention is not restricted to operations involving filling a photosensitive material through exposure, but is also applicable to a system of automatically filling with lines a paper surface by means of a pen plotter or the like. In this case, the size W of a spot is that of the point of the pen.

In connection with FIGS. 34C, 34D and 35, the following relationships apply:

FIG. 34C
$$\left\{ \begin{array}{l} q\left(\frac{w}{dy} \cdot dx, \frac{w}{dy} \cdot h\right) \\ (Rx, Ry + n \cdot W) \end{array} \right.$$

$$\left\{ \begin{array}{l} n = 0,1,2,3,\ldots \\ dy = Sy - Ry \\ dx = Rx - Qx \\ h = Qy - Ry \end{array} \right.$$

FIG. 34D
$$\left\{ \begin{array}{l} t(Qx, Qy + n \cdot W) \\ r\left(\frac{w}{dy} \cdot dx, \frac{w}{dy} \cdot h\right) \end{array} \right.$$

$$\left\{ \begin{array}{l} n = 0,1,2,3,\ldots \\ dy = Ty - Qy \\ dx = Rx - Qx \\ h = Ry - Qy \end{array} \right.$$

FIG. 35
$$q(Qx, Qy + nW)$$
$$r(Rx, Ry + nW)$$
$$n = 0,1,2,3,\ldots$$

Although the present invention has been described and illustrated in detail, it is clearly to be understood that the same is by way of illustration and example only and is not to be taken by way of limitation, the spirit and scope of the present invention being limited only by the appended claims.

I claim:

1. A method of filling an inner region of a graphic with traces of an imaging spot having a predetermined spot size, on an image plane of said graphic, said method comprising the steps of:
   (a) preparing graphic data which define border lines of said graphic,
   (b) on the basis of said graphic data, dividing said graphic into convex loops only along lines which are parallel to a predetermined direction,
   (c) detecting respective longitudinal directions of said convex loops,
   (d) with respect to each of said convex loops. generating an array of vectors convering an inner region of each such convex loop, with vectors belonging to said array having components in a longitudinal direction of said convex loop and being spacedly arrayed in a direction transverse to said vectors, the spacing between said vectors corresponding to said spot size, and
   (e) serially moving said imaging spot on said image plane along said vectors to thereby fill said inner region of said graphic.

2. The method of claim 1, wherein the step (b) includes the steps of:
   (b-1) on the basis of said graphic data, generating a reduced graphic which has the shape of said graphic but is reduced in size by a predetermined amount relative to said graphic,
   (b-2) dividing said reduced graphic along said lines to obtain said convex loops.

3. The method of claim 2, wherein said predetermined amount is substantially equal to one half of said spot size.

4. The method of claim 3, wherein the step (b) further includes the steps in:
   (b-3) detecting the presence of a concavity, if any, in said reduced graphic,
   (b-4) generating a bridge line for bridging a part of said concavity, and
   (b-5) replacing said part of said concavity with said bridge line before carrying out the step (b-2).

5. The method of claim 3, wherein the step (b) further includes the steps of:
   (b-6) detecting an intercrossing between border lines of said reduced graphic, and
   (b-7) dividing said reduced graphic into partial graphics at said intercrossing, each of said partial graphics being subjected to the step (b-2) individually in the manner of said reduced graphic.

6. The method of claim 2, wherein the step (b) includes the steps of:
   (b-21) generating parallel slit lines passing through respective apices of said reduced graphic, said parallel slit lines being parallel to said predetermined direction, and
   (b-22) dividing said reduced graphic with said parallel slit lines to generate said convex loops.

7. The method of claim 2, wherein the step (c) includes the steps of:
   (c-1) defining a first direction X and a second direction Y in relation to said reduced graphic, where said first direction X is perpendicular to said predetermined direction and said second direction Y is parallel to said predetermined direction,
   (c-2) detecting respective sizes of said convex loops in said first and second directions, and
   (c-3) with respect to each of said convex loops, comparing a first size of a convex loop in said first direction X with a second size of said convex loop in said second direction Y, to thereby detect said respective longitudinal directions of said convex loops.

8. The method of claim 7, wherein the step (d) includes the steps of:
   (d-1) classifying said convex loops into first and second groups according to said respective longitudinal directions of said convex loops, where first convex loops belonging to said first group have longitudinal directions parallel to said second direction Y and second convex loops belonging to said second group have longitudinal directions not parallel to said second direction Y,
   (d-2) for each of said first convex loops, generating said array of vectors in which respective directions of vectors are parallel to said second direction Y or parallel to a reverse direction thereof, and
   (d-3) for each of said second convex loops, generating said array of vectors in which respective directions of vectors are not parallel nor antiparallel to said second direction Y.

9. The method of claim 8, wherein said first and second convex loops are polygons, and the step (d-3e includes the steps of:
   (d-31) extracting a trapezoid from said second convex loops,
   (d-32) dividing said trapezoid into a triangle and a parallelogram,
   (d-33) generating first alternate vectors which are parallel to longer opposite sides of said parallelogram or parallel to a reverse direction thereof so that an inner region of said parallelogram is covered with said first alternate vectors, and
   (d-34e generating second alternate vectors which are parallel to a longest side of said triangle so that an inner region of said triangle is covered with said second alternate vectors, said array of vectors for said trapezoid being formed with said first and second alternate vectors.

10. The method of claim 9, wherein the step (d-3) further includes the step of:
   (d-35) for each of a plurality of polygons forming said second convex loops, generating an additional vector along a side of a corresponding polygon which is parallel to said second direction Y, and
   (d-36) for each of said second convex loops, adding said additional vector to said array of vectors.

* * * * *